United States Patent
Farag et al.

(10) Patent No.: US 12,538,151 B2
(45) Date of Patent: Jan. 27, 2026

(54) METHOD AND APPARATUS FOR CONFIGURABLE MEASUREMENT RESOURCES AND REPORTING

(71) Applicant: Samsung Electronics Co., Ltd., Suwon-si (KR)

(72) Inventors: Emad N. Farag, Flanders, NJ (US); Eko Onggosanusi, Coppell, TX (US); Dalin Zhu, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 18/155,715

(22) Filed: Jan. 17, 2023

(65) Prior Publication Data

US 2023/0247454 A1 Aug. 3, 2023

Related U.S. Application Data

(60) Provisional application No. 63/389,575, filed on Jul. 15, 2022, provisional application No. 63/305,496, filed on Feb. 1, 2022.

(51) Int. Cl.
*H04L 12/26* (2006.01)
*H04L 5/00* (2006.01)
*H04W 24/08* (2009.01)
*H04W 24/10* (2009.01)

(52) U.S. Cl.
CPC ........... *H04W 24/08* (2013.01); *H04L 5/0051* (2013.01); *H04W 24/10* (2013.01)

(58) Field of Classification Search
CPC .............. H04W 24/08; H04W 24/10; H04W 72/231; H04L 5/0051; H04L 5/0023; H04L 5/0048; H04L 5/0053; H04L 5/0094
See application file for complete search history.

(56) References Cited

U.S. PATENT DOCUMENTS

| 10,952,231 B2 * | 3/2021 | Liou ................... H04W 76/27 |
| 2019/0222289 A1 | 7/2019 | John Wilson et al. |
| 2021/0250994 A1 | 8/2021 | Sun et al. |
| 2022/0123891 A1 * | 4/2022 | Ji ......................... H04L 5/0051 |
| 2022/0124740 A1 * | 4/2022 | Ji ............................. H04L 1/06 |
| 2023/0198706 A1 * | 6/2023 | Maleki ................. H04L 5/0051 370/329 |

(Continued)

FOREIGN PATENT DOCUMENTS

| EP | 3863356 A1 * | 8/2021 | ........... H04L 5/0044 |
| TW | 202025698 A * | 7/2020 | ........... H04B 17/336 |

(Continued)

OTHER PUBLICATIONS

International Search Report and Written Opinion issued May 11, 2023 regarding International Application No. PCT/KR2023/001467, 7 pages.

Samsung, "Multi-beam enhancements", 3GPP TSG RAN WG1 Meeting #106-e, R1-2106865, Aug. 2021, 24 pages.

(Continued)

*Primary Examiner* — Thai Dinh Hoang

(57) ABSTRACT

Methods and apparatuses for configurable measurement resources and reporting in a wireless communication system. A method for operating a user equipment (UE) includes receiving configuration information for a set of reference signals (RSs) and receiving a dynamic indication for a subset of the set of RSs. The method further includes performing a first measurement of the subset of RSs and transmitting a first report based on the first measurement.

17 Claims, 8 Drawing Sheets

(56) References Cited

U.S. PATENT DOCUMENTS

2023/0299916 A1* 9/2023 Muruganathan ...... H04L 5/0094
370/329
2024/0372661 A1* 11/2024 Park ..................... H04L 5/0044

FOREIGN PATENT DOCUMENTS

| WO | 2021059162 A1 | 4/2021 | | |
|---|---|---|---|---|
| WO | WO-2021067890 A1 | * | 4/2021 | ......... H04L 27/2613 |
| WO | 2021198922 A1 | | 10/2021 | |
| WO | WO-2022024042 A1 | * | 2/2022 | ........... H04B 7/0626 |
| WO | WO-2022086415 A1 | * | 4/2022 | ........... H04L 5/0048 |
| WO | WO-2022189857 A1 | * | 9/2022 | |

OTHER PUBLICATIONS

"3rd Generation Partnership Project; Technical Specification Group Radio Access Network; NR; Physical channels and modulation (Release 16)", 3GPP TS 38.211 V16.8.0, Dec. 2021, 134 pages.
"3rd Generation Partnership Project; Technical Specification Group Radio Access Network; NR; Multiplexing and channel coding (Release 16)", 3GPP TS 38.212 V16.8.0, Dec. 2021, 153 pages.
"3rd Generation Partnership Project; Technical Specification Group Radio Access Network; NR; Physical layer procedures for control (Release 16)", 3GPP TS 38.213 V16.8.0, Dec. 2021, 189 pages.
"3rd Generation Partnership Project; Technical Specification Group Radio Access Network; NR; Physical layer procedures for data (Release 16)", 3GPP TS 38.214 V16.8.0, Dec. 2021, 172 pages.
"5G; NR; Medium Access Control (MAC) protocol specification (3GPP TS 38.321 version 16.7.0 Release 16)", ETSI TS 138 321 V16.7.0, Jan. 2022, 160 pages.
"5G; NR; Radio Resource Control (RRC); Protocol specification (3GPP TS 38.331 version 16.7.0 Release 16)", ETSI TS 138 331 V16.7.0, Jan. 2022, 950 pages.
Extended European Search Report issued Mar. 24, 2025 regarding Application No. 23749946.2, 9 pages.
Samsung, "Multi-beam enhancements", 3GPP TSG RAN WG1 #104b-e, R1-2103221, Apr. 2021, 21 pages.
Moderator (CATT), "Moderator summary #1 (updated) on M-TRP simultaneous transmission with multiple Rx panels", 3GPP TSG RAN WG1 #105-e, R1-2106153, May 2021, 61 pages.

* cited by examiner

METHOD AND APPARATUS FOR CONFIGURABLE MEASUREMENT RESOURCES AND REPORTING

CROSS-REFERENCE TO RELATED APPLICATIONS AND CLAIM OF PRIORITY

The present application claims priority to U.S. Provisional Patent Application No. 63/305,496, filed on Feb. 1, 2022; and U.S. Provisional Patent Application No. 63/389,575, filed on Jul. 15, 2022. The contents of the above-identified patent documents are incorporated herein by reference.

TECHNICAL FIELD

The present disclosure relates generally to wireless communication systems and, more specifically, the present disclosure relates to a configurable measurement resources and reporting in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a configurable measurement resources and reporting in a wireless communication system.

In one embodiment, a user equipment (UE) is provided. The UE includes a transceiver configured to receive configuration information for a set of reference signals (RSs) and to receive a dynamic indication for a subset of the set of RSs. The UE further includes a processor operably coupled to the transceiver. The processor is configured to perform a first measurement of the subset of RSs and transmit a first report based on the first measurement.

In another embodiment, a base station (BS) is provided. The BS includes a transceiver configured to transmit configuration information for a set of RSs, transmit a dynamic indication for a subset of the set of RSs, and receive a first report based on the subset of RSs. The BS further includes a processor operably coupled to the transceiver. The processor is configured to determine, based on the first report, first TCI states.

In yet another embodiment, a method for operating a UE is provided. The method includes receiving configuration information for a set of RSs and receiving a dynamic indication for a subset of the set of RSs. The method further includes performing a first measurement of the subset of RSs and transmitting a first report based on the first measurement.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.8.0, "NR; Physical channels and modulation"; 3GPP TS 38.212 v16.8.0, "NR; Multiplexing and Channel coding"; 3GPP TS 38.213 v16.8.0, "NR; Physical Layer Procedures for Control"; 3GPP TS 38.214 v16.8.0, "NR; Physical Layer Procedures for Data"; 3GPP TS 38.321 v16.7.0, "NR; Medium Access Control (MAC) protocol specification"; and 3GPP TS 38.331 v16.7.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
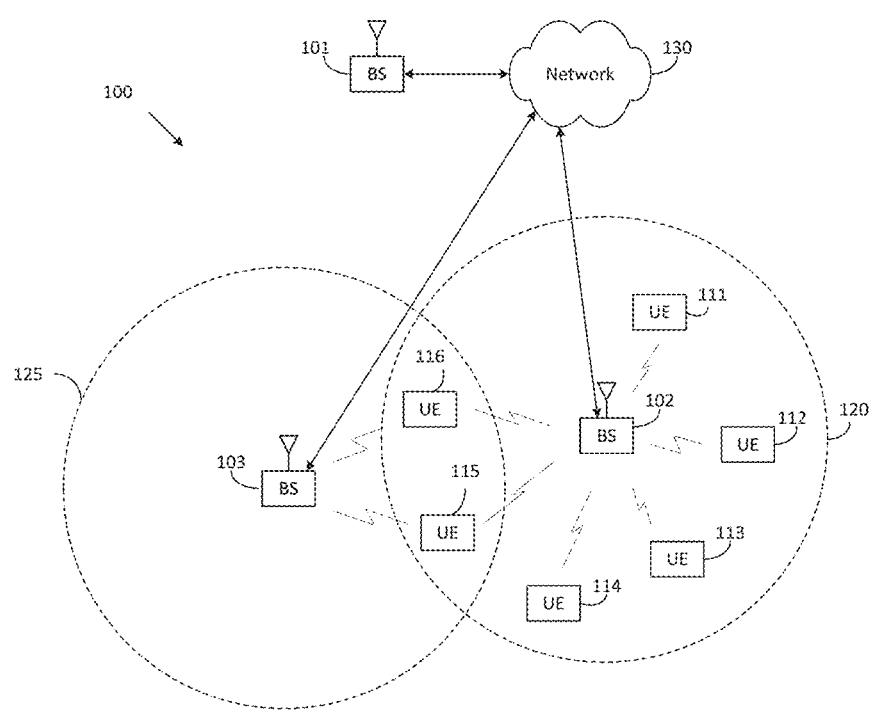
FIG. 1 illustrates an example of wireless network according to embodiments of the present disclosure.
Figure 2:
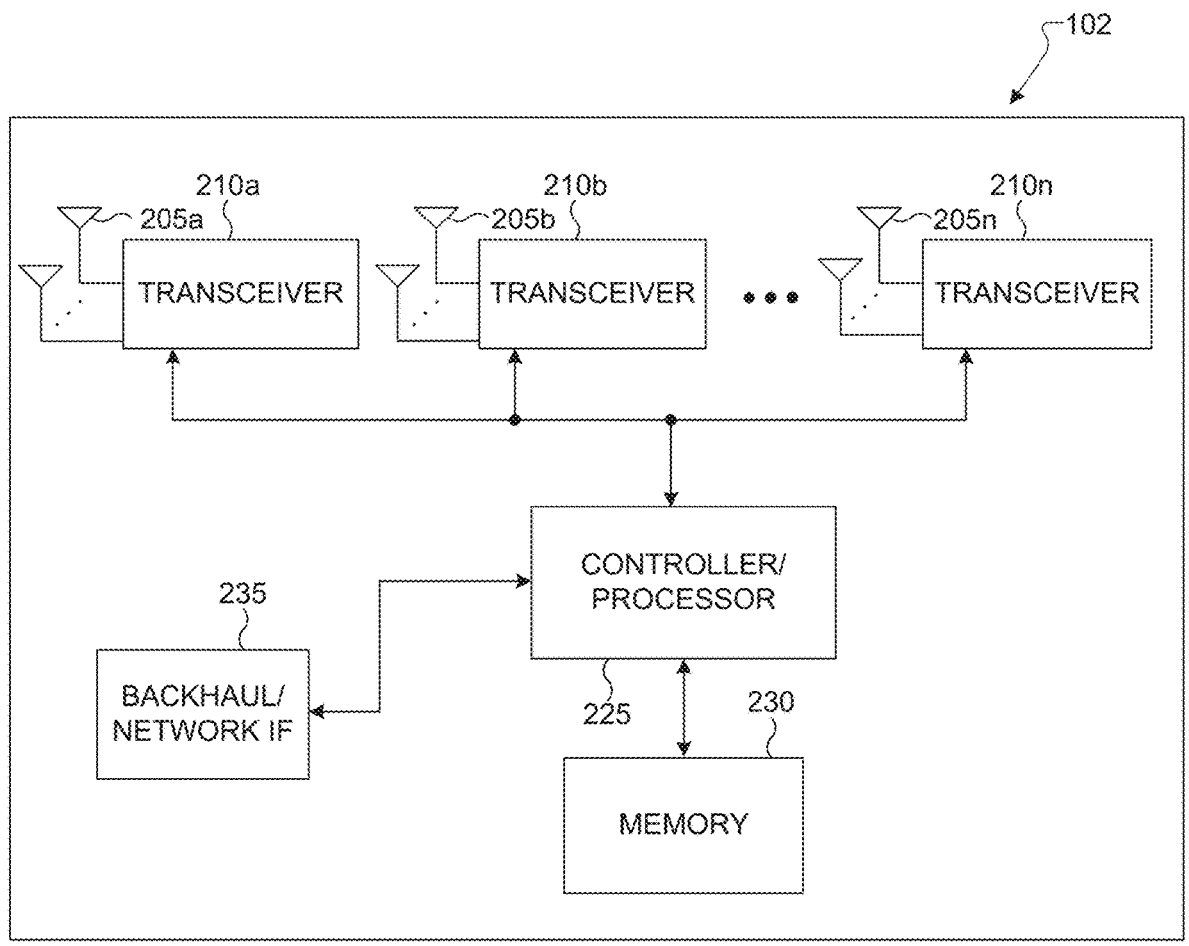
FIG. 2 illustrates an example of gNB according to embodiments of the present disclosure.
Figure 3:
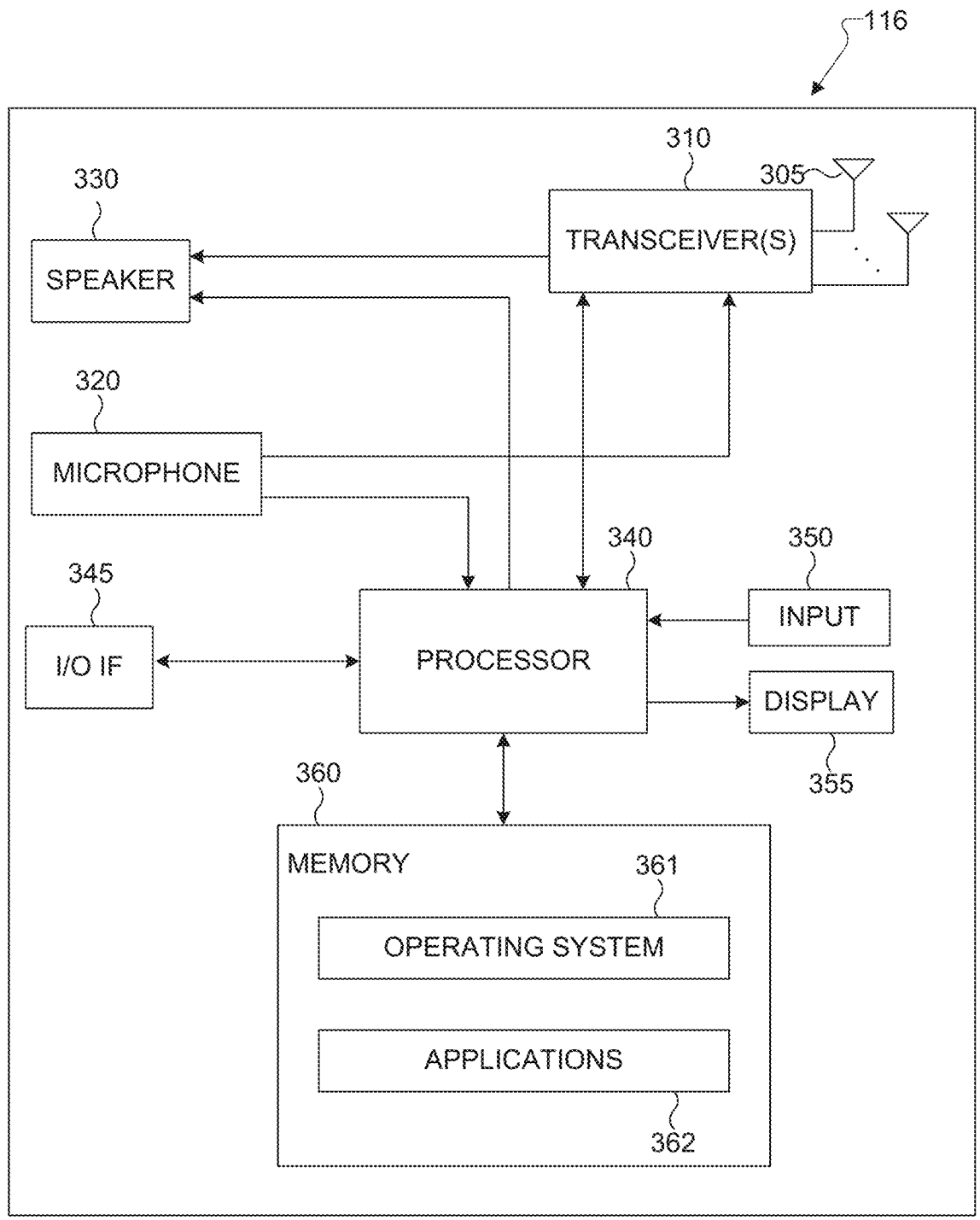
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal,"

"wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a configurable measurement resources and reporting in a wireless communication system. In certain embodiments, and one or more of the gNBs 101-103 includes circuitry, programing, or a combination thereof, for a configurable measurement resources and reporting in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes a configurable measurement resources and reporting in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a configurable measurement resources and reporting in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
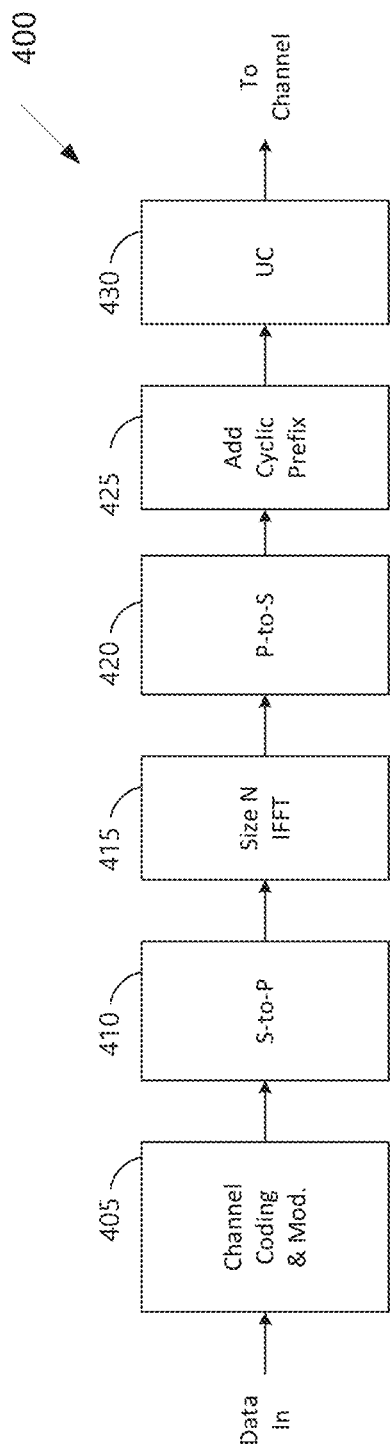
FIGS. 4 and 5 illustrate example of wireless transmit and receive paths according to this disclosure.
Figure 5:
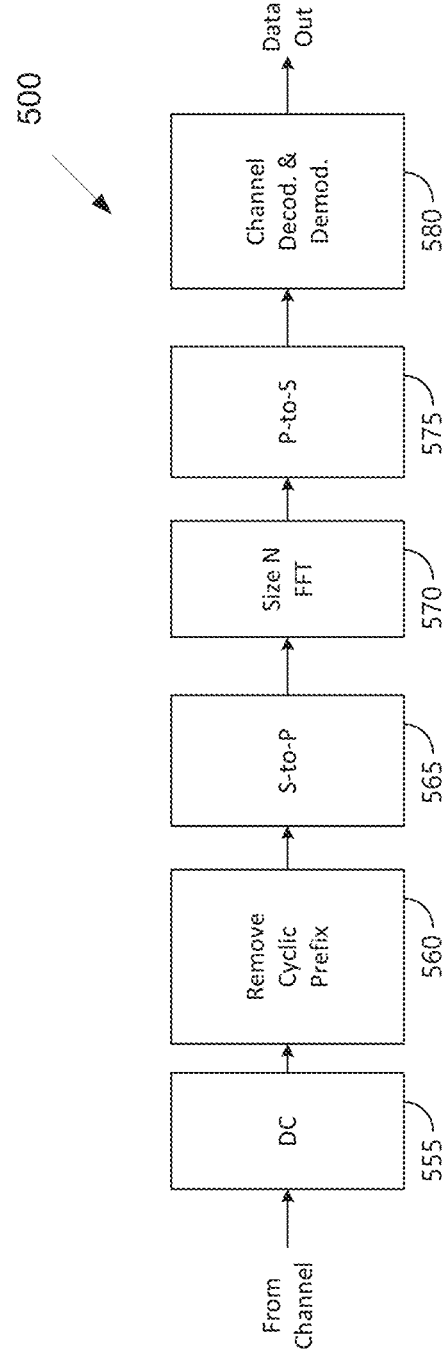

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a downconverter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNB s 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DCI, and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a MIMO transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship or spatial relation between a source reference signal (e.g., synchronization signal/physical broadcast channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE. The TCI state and/or the spatial relation reference RS can determine a spatial Tx filter for transmission of downlink channels from the gNB, or a spatial Rx filter for reception of uplink channels at the gNB.

Figure 6A:
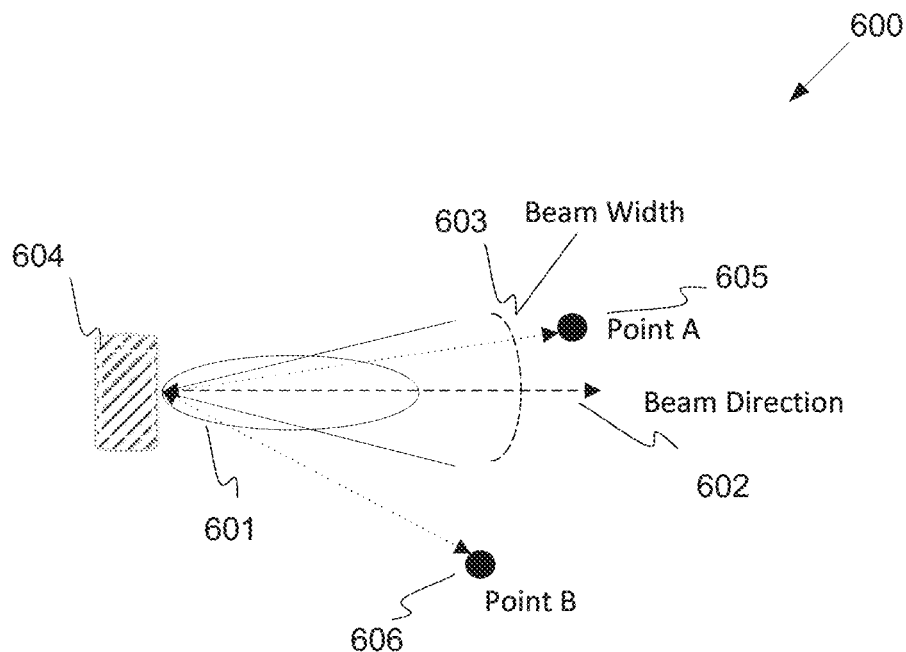
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
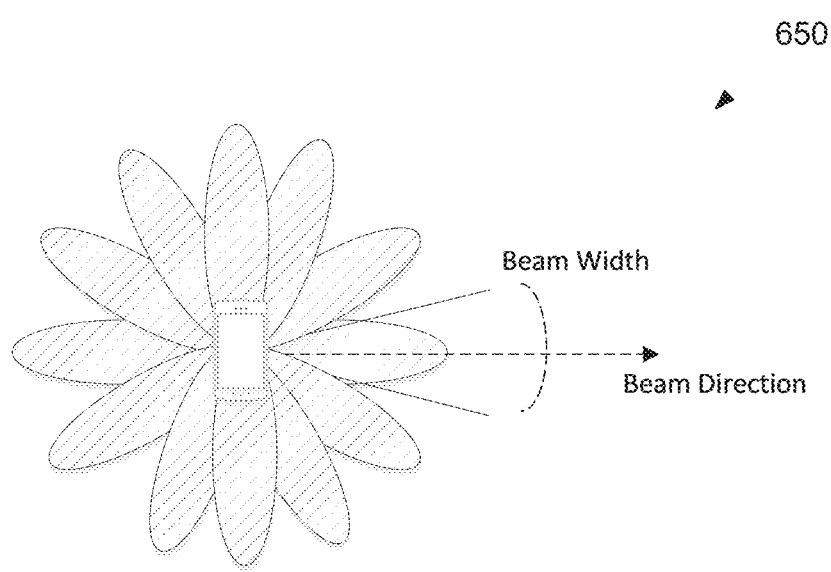
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
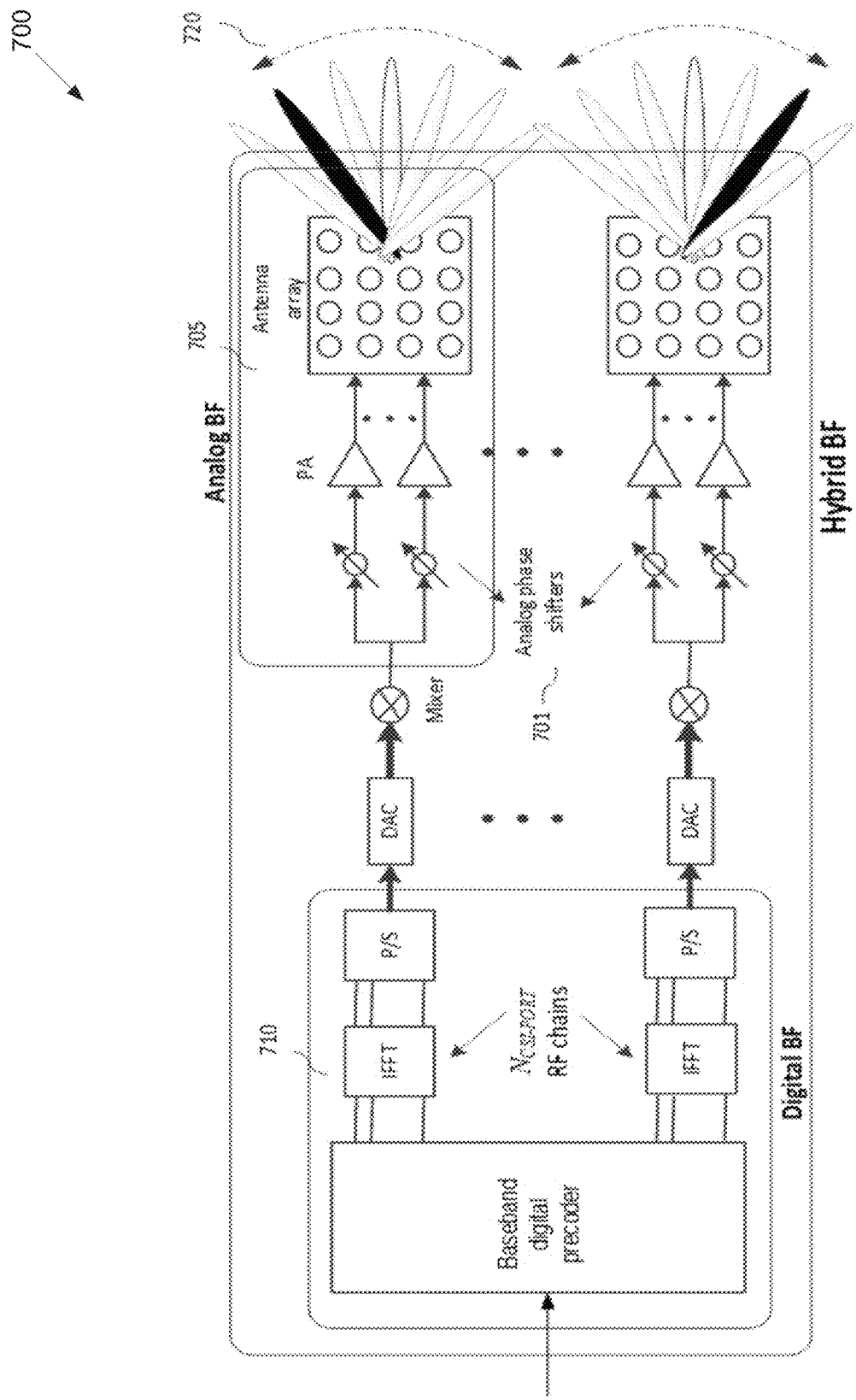
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

Rel-17 introduced the unified TCI framework, where a unified or master or main or indicated TCI state is signaled or indicated to the UE also referred to as an indicated TCI state. The unified or master or main or indicated TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state that can be used at least for UE-dedicated DL channels; and (3) in case of separate TCI state indication, wherein different beams are used for DL and UL channels, a UL TCI state that can be used at least for UE-dedicated UL channels.

The unified (master or main or indicated) TCI state is TCI state of UE-dedicated reception on PDSCH/PDCCH or dynamic-grant/configured-grant based PUSCH and all of dedicated PUCCH resources.

The unified TCI framework applies to intra-cell beam management, wherein, the TCI states have a source RS that is directly or indirectly associated, through a quasi-co-location relation, e.g., spatial relation, with an SSB of a serving cell. The unified TCI state framework also applies to inter-cell beam management, wherein a TCI state can have a source RS that is directly or indirectly associated, through a quasi-co-location relation, e.g., spatial relation, with an SSB of cell that has a PCI different from the PCI of the serving cell.

A qCL relation can be quasi-location with respect to one or more of the following relations (as shown in 3GPP standard specification 38.214): (1) Type A, {Doppler shift, Doppler spread, average delay, delay spread}; (2) Type B, {Doppler shift, Doppler spread}; (3) Type C, {Doppler shift, average delay}; and (4) Type D, {Spatial Rx parameter}.

In addition, quasi-co-location relation can also provide a spatial relation for UL channels, e.g., a DL source reference signal provides information on the spatial domain filter to be used for UL transmissions, or the UL source reference signal provides the spatial domain filter to be used for UL transmissions, e.g., same spatial domain filter for UL source reference signal and UL transmissions.

The unified (master or main or indicated) TCI state applies at least to UE dedicated DL and UL channels. The unified (master or main or indicated) TCI can also apply to other DL and/or UL channels and/or signals e.g., non-UE dedicated channel and SRS.

Rel-15 introduced a single framework for CSI reporting and beam measurement reporting known as the CSI framework. The CSI framework includes one of: (1) M≥1 CSI resource settings, (i.e., CSI-ResourceConfig), which configures resources for channel measurement (e.g., based on NZP CSI-RS, or SSB) or interference measurement (e.g., based on CSI-IM). For beam measurement and reporting, channel measurement resources are used. The CSI resource setting is configured a time domain behavior which can be periodic, semi-persistent or aperiodic; or (2) N≥1 CSI reporting setting, (i.e., CSI-ReportConfig), which configures the type of CSI information to be reported, the frequency granularity of the reported measurements as well as the time domain behavior of the CSI report. The CSI report can be periodically configured on PUCCH, semi-persistently configured on PUCCH or PUSCH or aperiodically configured on PUSCH.

A reference RS can be triggered by the network (or gNB), for example via DCI in case of aperiodic (AP) RS, or can be configured with a certain time-domain behavior, such as a periodicity and offset in case of periodic RS, or can be a combination of such configuration and activation/deactivation in case of semi-persistent RS.

A CSI report (including a beam measurement report) can be triggered by the network (or gNB), for example via DCI in case of aperiodic (AP) CSI report, or can be configured with a certain time-domain behavior, such as a periodicity and offset in case of periodic CSI report, or can be a combination of such configuration and activation/deactivation in case of semi-persistent CSI report.

CSI-RS resources are organized into CSI-RS resources sets. There can be one or more CSI-RS resource sets in a CSI resource setting (i.e., CSI-ResourceConfig). For periodic, and semi-persistent CSI-RS, there is one CSI-RS resource set in a CSI resource setting. For aperiodic CSI-RS, there can be up to 16 CSI-RS resource sets in a CSI resource setting. For a CSI-RS resource with periodic or semi-persistent time domain behavior, the UE is configured periodicity and offset through higher layer parameter CSI-ResourcePeriodicityAndOffset. The periodicity defines the period in slots (e.g., 4, 5, 8, 10, . . . slots) at which CSI-RS resource is transmitted. The offset is an offset within the period relative to slot 0 of SFN 0 of the CSI-RS resource. Periodic resources are active after RRC configuration. Semi-persistent resources are inactive after RRC configuration, a MAC CE command actives transmission on these resources, a MAC CE command can also deactivate transmission on these resources. Aperiodic resources are triggered by L1 control signaling (DCI).

For a CSI report with periodic or semi-persistent time domain behavior, the UE is configured periodicity and offset through higher layer parameter CSI-ReportPeriodicityAndOffset. The periodicity defines the period in slots (e.g., 4, 5, 8, 10, . . . slots) at which CSI report is transmitted. The offset is an offset within the period relative to slot 0 of SFN 0 of the CSI report. Periodic CSI reports are active after RRC configuration; periodic CSI reports are transmitted on PUCCH. Semi-persistent RRC reports can be transmitted on PUCCH or PUSCH. Semi-persistent CSI reports transmitted on PUCCH are activated or deactivated by MAC CE command, and are inactive when first configured. CSI reports transmitted on PUSCH are activated or deactivated by DCI, and are inactive when first configured. Aperiodic CSI reports are transmitted on PUSCH and are triggered by DCI.

TABLE 1 shows possible triggering/activation of CSI reporting for possible CSI-RS reconfigurations (e.g., as shown in 3GPP standard specification 38.214)

TABLE 1

| | Triggering/activation of CSI reporting | | |
|---|---|---|---|
| CSI-RS Configuration | Periodic CSI Report | Semi-Persistent CSI Report | Aperiodic CSI Report |
| Periodic CSI-RS | No dynamic triggering or activation | On PUCCH: MAC CE command On PUSCH: DCI triggering | Triggered by DCI |
| Semi-Persistent CSI-RS | Not Supported | On PUCCH: MAC CE command On PUSCH: DCI triggering | Triggered by DCI |
| Aperiodic CSI-RS | Not Supported | Not supported | Triggered by DCI |

For beam management, L1-RSRP reporting can be used to assist the network in identifying new beams. The UE may be configured with CSI-RS resources, SSB resources or both CSI-RS and SSB resources, wherein the CSI-RS resources can be of Quasi-Co-Location of Type-C or Type-C and Type-D. Each resource can be associated with a beam. The UE measures and computes the L1-RSRP on the configured resources and reports the measurement to network.

If the UE reports one L1-RSRP value (e.g., higher layer parameter nrofReportedRS is configured to be 1), the reported L1-RSRP value is defined as a 7-bit value in the range [−140, −44] dBm, with 1 dB step size. If the UE reports more than one L1-RSRP value (e.g., higher layer parameter nrofReportedRS is configured to be more than 1 or higher layer parameter groupBasedBeamReporting is configured as "enabled"), the UE uses differential beam reporting, wherein the largest L1-RSRP value is quantized to 7-bits in the range [−140, −44] dBm, with 1 dB step size. The other L1-RSRP values are reported as differential values relative to the largest L1-RSRP value and are quantized to 4-bits with a 2 dB step size.

As the UE moves around the beam to use for communication with the network changes, the measurement reports help the network in identifying new beams. There is a tradeoff between the accuracy of the beam used for communication between the network and the UE and periodicity, and hence overhead, of the CSI-RS/SSB resources as well as the CSI report. The longer the periodicity of the CSI-RS resource and/or CSI report, the less accurate the beam, but the lower the overhead used for CSI-RS and/or CSI report. On the other hand, the shorter the periodicity of the CSI-RS resource and/or CSI report, the more accurate the beam, but the higher the overhead of the resources used for CSI-RS and/or CSI report. The accuracy of a beam is defined as the percentage of time, the beam used for the communication between the network and the UE is the best beam. As the time between beam measurement reports become longer, the beam measurement information becomes stale and hence less accurate.

In NR, a UE can be configured to transmit a SRS, the higher layer parameter usage configured in an SRS resource set can be set to "beamManagement," wherein the gNB can measure the SRS resources of the SRS resource set to assist in the beam management procedure. When the UE uses the same beam (spatial domain transmit filter) across a set of SRS resources, the gNB can measure the SRS resources to fine tune a spatial domain receive filter of the gNB. When the UE uses different beams (spatial domain transmit filters) across a set of SRS resources, the gNB can measure the SRS resources to determine a UE transmit beam (spatial domain transmit filter), wherein the gNB can indicate to the UE the preferred beam for transmission of an UL channel.

The time domain behavior of an SRS resource can be configured as periodic, semi-persistent or aperiodic. The network configures SRS resources in the same SRS resource set with the same time domain behavior. For a SRS resource with periodic or semi-persistent time domain behavior, the UE is configured periodicity and offset through higher layer parameter SRS-PeriodicityAndOffset. The periodicity defines the period in slots (e.g., 1, 2, 4, 5, 8, 10, . . . slots) at which SRS resource is transmitted. The offset is an offset within the period relative to slot 0 of SFN 0 of the SRS resource.

One of the promising areas to enhance the performance of beam management for a UE is the use of predictive schemes based on AI/ML whereby the beam management algorithm can predict future beams based on acquired history from the UE and possibly that of other UEs as well as the positioning information of the UE. In such scenario, the UE can reduce the measurement/reporting rate of beam measurement reports and/or the rate at which the SRS is transmitted. Using predictive schemes (e.g., time domain prediction), the beam management algorithm (e.g., operating in the network) can predict a beam to use at different intervals between two beam measurement reports and/or SRS transmissions.

Figure 8:
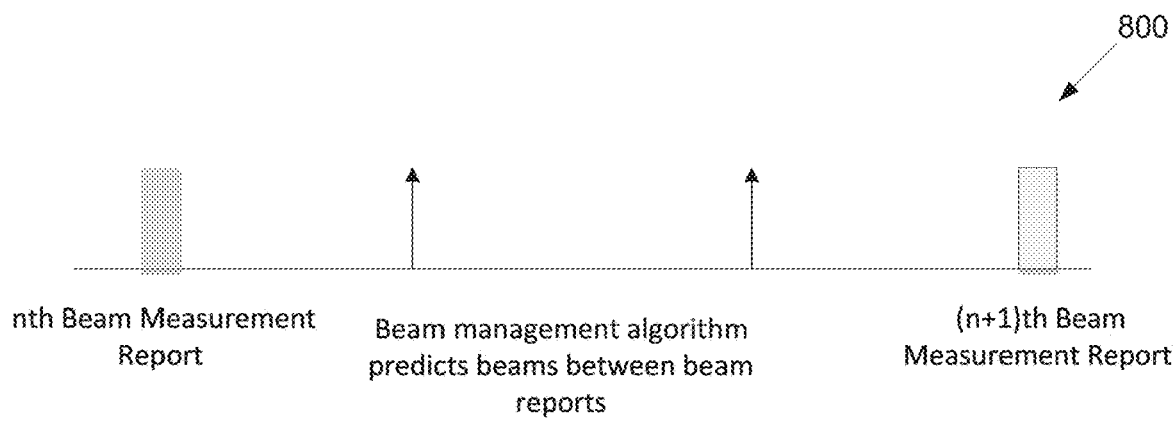
FIG. 8 illustrates an example of beam measurement report according to embodiments of the present disclosure.

FIG. 8 illustrates an example of beam measurement report 800 according to embodiments of the present disclosure. An embodiment of the beam measurement report 800 shown in FIG. 8 is for illustration only.

For example, as shown in FIG. 8, the network (e.g., gNB) receives the nth beam measurement report (or SRS transmission) and the (n+1)th beam measurement (or SRS transmission), the time between the nth beam measurement report (or SRS transmission) and the (n+1)th beam measurement report (or SRS transmission) can be long such that the beam can change in between, if the network where just to the rely on the nth beam measurement report (or SRS transmission) up until the (n+1)th beam measurement report (or SRS transmission), the beam used could become obsolete leading to beam failures. Instead, the beam management algorithm can predict beams to use at intermediate time instances between the two beam measurement reports (or SRS transmissions). The network signals the predicated beams to the UE, e.g., using the unified TCI framework such a DL related DCI Format with a DL assignment or without a DL assignment (e.g., using DCI Format 1_1 or DCI Format 1_2).

However, the accuracy of beam prediction algorithms (e.g., based on AI/ML) for predicting future beams can change over time, and hence it may be desirable to adjust the rate at which beam measurements (e.g., L1-RSRP and/or L1-SINR) are being measured and reported or the rate at which SRS is transmitted. According to the existing NR procedures and methods, a change in the periodicity of the CSI-RS resources and/or CSI report and/or SRS resource requires a RRC reconfiguration to reconfigure the CSI-ResourcePeriodicityAndOffset and/or CSI-ReportPeriodicityAndOffset and/or SRS-PeriodicityAndOffset. Doing so, may incur additional overhead and high latency.

An alternative solution considered in this disclosure is to configure multiple periodicity and offset values, (e.g., multiple CSI-ResourcePeriodictyAndOffset and/or CSI-ReportPeriodicityAndOffset and/or SRS-PeriodicityAndOffset). The network can then select and signal a periodicity and offset value through MAC CE signaling and/or DCI signaling. Alternatively, multiple resources or resource sets for CSI-RS or SRS and CSI reporting can be configured, the network can then select and signal a resource or resource set dynamically through MAC CE signaling and/or DCI signaling. This can be determined, for example based on the accuracy of the beam management prediction algorithm and the desired time between beam measurement reports.

The present disclosure provides the following main components: (1) configuration of more than one periodicity/offset (or sets of resources) for a NZP CSI-RS resource of resource type periodic or semi-persistent, one periodicity/offset (or set of resources) is used at any time; (2) configuration of more than one periodicity/offset (or sets of resources) for a CSI report of type periodic or semi-persistent, one periodicity/offset (or set of resources) is used at any time; (3) configuration of more than one periodicity/offset (or sets of resources) for a SRS resource of resource type periodic or semi-persistent, one periodicity/offset (or set of resources) is used at any time; (4) the UE can determine the periodicity/offset of the resource (or set of resources) based on a set rule, or by further signaling by RRC and/or MAC CE and/or L1 Control (e.g., DCI); (5) different reference signals configured for beam measurement and beam indication; and (6) UE can be indicated multiple TCI states and selects one for application to a quasi-co-location (QCL) or a spatial domain filter.

NR is a beam-based air interface, multi-beam operation is especially relevant and important for operation in mmWave bands (or FR2) or for higher frequency bands, where a transmission-reception process includes a receiver selecting a receive (RX) beam for a given TX beam. For DL multi-beam operation, a UE selects a DL RX beam for every DL TX beam (that corresponds to a reference RS). Therefore, when DL RS, such as CSI-RS and/or SSB, is used as reference RS, the NW/gNB transmits the DL RS to the UE for the UE to be able to select a DL RX beam. In response, the UE measures the DL RS, and in the process selects a DL RX beam, and reports the beam metric associated with the quality of the DL RS.

Conversely, when an UL RS, such as a SRS and/or a DMRS, is used as reference RS, the NW/gNB triggers or configures the UE to transmit the UL RS. The gNB, upon receiving and measuring the UL RS, can select an UL RX beam, and if reciprocity holds, a DL TX beam. The accuracy of the beam used for communication between the base station and the UE depends on the frequency, or amount of resources, at which the RS used for beam measurement are transmitted and/or the frequency, or amount of resources, at which the beam measurements are reported.

When the UE is moving at high speeds and operating at high frequencies, a large number of narrow beams are used to provide coverage, and as a result of the UE's high speed movement, beams change rapidly. If the time between resources used for beam measurements and the time between beam measurement reports is not small enough, beams can become obsolete before a new beam is found, leading to beam failure and link failure issues.

To address this, predictive beam management using AI/ML techniques can be used to predict future beams, between measurement reports, especially for UEs moving along a known trajectory. Thus, allowing beam measurement and reporting at a lower rate, but with reasonable performance. Overtime, the reliability of beam predication can change, when the reliability of beam predication is high, the time beam measurements or beam measurement reports can be large (or a small amount of resources can be allocated to reference signals used for measurements and/or to channels used for reporting), if the reliability of beam prediction becomes degrades, this may necessitate more frequent beam measurements and beam reporting (or a larger amount of resources can be allocated to reference signals used for measurements and/or to channels used for reporting). For example, when a user becomes first active, or if there a change in the environment, a training period is needed before beam prediction becomes accurate enough to use between measurement reports separated by a large time. During the training period, the beam measurement reports are transmitted more frequently.

To address these points, this disclosure provides configuring RS resources with more than one periodicity or multiple resource sets with different amounts of resources for each resource set, and configuring beam reports with more than one periodicity or multiple report sizes. The network can signal one of the configured periodicities or resource sets or report sizes to the UE through dynamic signaling such as MAC CE signaling and DCI signaling. The benefit of this scheme is that it may allow for fast adaptation of the beam measurement and reporting periodicity or report size as the channel conditions changes and/or as the requirements of the beam prediction algorithm for beam measurements changes.

The present disclosure relates to a 5G/NR communication system and provides design aspects related to the following main components: (1) configuration of more than one periodicity/offset (or sets of resources) for a NZP CSI-RS resource of resource type periodic or semi-persistent, one periodicity/offset (or set of resources) is used at any time; (2) Configuration of more than one periodicity/offset (or sets of resources) for a CSI report of type periodic or semi-persistent, one periodicity/offset (or set of resources) is used at any time; (3) configuration of more than one periodicity/offset (or sets of resources) for a SRS resource of resource type periodic or semi-persistent, one periodicity/offset (or set of resources) is used at any time; (4) the UE can determine the periodicity/offset of the resource (or set of resources) based on a set rule, or by further signaling by RRC and/or MAC CE and/or L1 Control (e.g., DCI); (5) different reference signals configured for beam measurement and beam indication; and (6) UE can be indicated multiple TCI states and selects one for application to a quasi-co-location or a spatial domain filter.

In the following, both FDD and TDD are considered as a duplex method for DL and UL signaling. Although exemplary descriptions and embodiments to follow assume orthogonal frequency division multiplexing (OFDM) or orthogonal frequency division multiple access (OFDMA), this invention can be extended to other OFDM-based transmission waveforms or multiple access schemes such as filtered OFDM (F-OFDM). The present disclosure considers several components that can be used in conjunction or in combination with one another, or can operate as standalone schemes.

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal. The term "deactivation" describes an operation wherein a UE receives and decodes a signal from the network (or gNB) that signifies a stopping point in time. The stopping point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal.

Terminology such as TCI, TCI states, SpatialRelationInfo, target RS, reference RS, and other terms is used for illustrative purposes and is therefore not normative. Other terms that refer to same functions can also be used.

DL reference signals used for beam measurement can include; SSBs and NZP CSI-RS reference signals.

In one example, the CSI-ResourceConfig is configured with resource type "periodic." The CSI-RS resources included in the CSI-ResourceConfig are periodic resources that are configured with CSI-ResourcePeriodicityAndOffset providing the periodicity and offset of the CSI-RS resource. The CSI-RS resource is configured with more than one CSI-ResourcePeriodicityAndOffset. One of the more than one CSI-ResourcePeriodictyAndOffset becomes effective at the time of (re-)configuration. In one example, the first CSI-ResourcePeriodictyAndOffset in the list of CSI-ResourcePeriodicityAndOffset is used at the time of (re-)configuration. In another example, the CSI-ResourcePeriodictyAndOffset with the shortest (or longest) periodicity is used at the time of (re-)configuration. In another example, the (re-)configuration message of the CSI-RS resource includes an indication of the CSI-ResourcePeriodictyAndOffset to use.

In one example, the CSI-ResourceConfig is configured with resource type "periodic." The CSI-ResourceConfig includes more than one CSI-RS resource sets. One of the more than one CSI-RS resource sets becomes effective at the time of (re-)configuration. In one example, the first CSI-RS resource set is used at the time of (re-)configuration. In another example, the last CSI-RS resource set is used at the time of (re-)configuration. In another example, the (re-)configuration message of the CSI-RS resource includes an indication of the CSI-RS resource set to use.

In one example, a MAC CE message indicates which of the configured CSI-ResourcePeriodictyAndOffset values (or CSI-RS resource sets) to use. The indicated CSI-ResourcePeriodictyAndOffset (or CSI-RS resource set) by MAC CE becomes effective after a time $T_1$. In one example, $T_1$ is measured from start (or end) of the PDSCH transmission containing the MAC CE and that is positively acknowledged (positive HARQ-ACK). In another example, $T_1$ is measured from the start (or end) of the UL channel (e.g., PUCCH or PUSCH) that includes a positive HARQ-ACK for a DL transmission including the MAC CE.

In one example, a L1 control (e.g., DCI) signal indicates which of the configured CSI-ResourcePeriodictyAndOffset values (or CSI-RS resource set) to use. The indicated CSI-ResourcePeriodictyAndOffset (or CSI-RS resource set) by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, an acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In one example, a MAC CE activates code points that correspond to one or more of the configured CSI-ResourcePeriodictyAndOffset values (or CSI-RS resource sets). In case one code point is activated, the CSI-ResourcePeriodictyAndOffset (or CSI-RS resource set) corresponding to the code point is used, and becomes effective after a time $T_1$. In one example, $T_1$ is measured from start (or end) of the PDSCH transmission containing the MAC CE and that is positively acknowledged (positive HARQ-ACK). In another example, $T_1$ is measured from the start (or end) of the UL channel (e.g., PUCCH or PUSCH) that includes a positive HARQ-ACK for a DL transmission containing the MAC CE.

If more than one code points are activated, a L1 control (e.g., DCI) message indicates which of the activated CSI-ResourcePeriodictyAndOffset (or CSI-RS resource sets) code points to use. The indicated CSI-ResourcePeriodictyAndOffset (or CSI-RS resource set) by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, the acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In one example, let the number of periodicities and offsets configured by CSI-ResourcePeriodictyAndOffset can be N (or the number of CSI-RS resource sets can be N). The configured periodicities and offsets (or CSI-RS resource sets) are $(P_0, O_o), (P_1, O_1), \ldots, (P_{N-1}, O_{N-1})$. At time $T_0$, periodicity and offset (or CSI-RS resource set) $(P_0, O_0)$ are used. At time $T_1$, periodicity and offset (or CSI-RS resource set)$(P_1, O_1)$ are used. At time $T_2$, periodicity and offset (or CSI-RS resource set) $(P_2, O_2)$ are used . . . . At time $T_{N-1}$, periodicity and offset (or CSI-RS resource set)$(P_{N-1}, O_{N-1})$ are used. In one example, $T_0 < T_1 \ldots < T_{N-1}$. In one example, times $T_0, T_1, T_2, \ldots$ can be relative to the (re-)configuration message, i.e., measured from the (re-)configuration message. In another example, time $T_1, T_2, \ldots$ can be absolute times. In one example time $T_0$ is the time of the (re-) configuration message. In one example, $T_0, T_1, \ldots, T_{N-1}$ can be specified in the system specification and/or configured and/or updated by higher layer signaling. In one example, N=2. In one example, N=2 and $T_0$ is specified in the system specifications and $T_1$ is configured or updated by higher layer signaling. In one example, $T_0, T_1, \ldots, T_{N-1}$ depend on the sub-carrier spacing.

In one example, the CSI-ResourceConfig is configured with resource type "semiPersistent." The CSI-RS resources included in the CSI-ResourceConfig are semi-persistent resources that are configured with CSI-ResourcePeriodicityAndOffset providing the periodicity and offset of the CSI-RS resource. The CSI-RS resource is configured with more than one CSI-ResourcePeriodicityAndOffset. One of the more than one CSI-ResourcePeriodicityAndOffset becomes effective at the time of (re-)configuration to use at activation. In one example, the first CSI-ResourcePeriodictyAndOffset in the list of CSI-ResourcePeriodicityAndOffset is used at the time of activation by MAC CE. In another example, the CSI-ResourcePeriodicityAndOffset with the shortest (or longest) periodicity is used at the time of activation by MAC CE. In another example, the (re-)configuration message of the CSI-RS resource includes an indication of the CSI-ResourcePeriodicityAndOffset to use at the time of activation by MAC CE.

In one example, the CSI-ResourceConfig is configured with resource type "semiPersistent." The CSI-ResourceConfig includes more than one CSI-RS resource sets. One of the more than one CSI-RS resource sets becomes effective at the time of (re-)configuration to use at activation. In one example, the first CSI-RS resource set is used at the time of activation by MAC CE. In another example, the last CSI-RS resource set is used at the time of activation by MAC CE. In another example, the (re-)configuration message of the CSI-RS resource includes an indication of the CSI-RS resource set to use at the time of activation by MAC CE.

In one example, a MAC CE message (separate from the MAC CE message activating the semi-persistent CSI-RS resource) indicates which of the configured CSI-ResourcePeriodictyAndOffset values (or CSI-RS resource sets) to use.

In one example, the indicated CSI-ResourcePeriodictyAndOffset (or CSI-RS resource set) by MAC CE becomes effective after a time $T_1$. In one example, $T_1$ is measured from start (or end) of the PDSCH transmission containing the MAC CE and that is positively acknowledged (positive HARQ-ACK). In another example, $T_1$ is measured from the start (or end) of the UL channel (e.g., PUCCH or PUSCH) that includes a positive HARQ-ACK for a DL transmission containing the MAC CE.

In another example, the indicated CSI-ResourcePeriodictyAndOffset (or CSI-RS resource set) by MAC CE becomes effective at the next activation of the semi-persistent CSI-RS resource by MAC CE.

In one example, a MAC CE message for the activation of the semi-persistent CSI-RS resource indicates which of the configured CSI-ResourcePeriodictyAndOffset values (or CSI-RS resource sets) to use. The indicated CSI-ResourcePeriodictyAndOffset (or CSI-RS resource set) by MAC CE becomes effective at the time of the activation of the semi-persistent CSI-RS resource.

In one example, a L1 control (e.g., DCI) signal indicates which of the configured CSI-ResourcePeriodictyAndOffset values (or CSI-RS resource sets) to use.

In one example, the indicated CSI-ResourcePeriodictyAndOffset (or CSI-RS resource set) by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, an acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In another example, the indicated CSI-ResourcePeriodictyAndOffset (or CSI-RS resource set) by DCI becomes effective at the next activation of the semi-persistent CSI-RS resource by MAC CE.

In one example, a MAC CE activates code points that correspond to one or more of the configured CSI-ResourcePeriodictyAndOffset values (or CSI-RS resource sets). In case one code point is activated: (1) in one example, the CSI-ResourcePeriodictyAndOffset (or CSI-RS resource set) corresponding to the code point is used, and becomes effective after a time $T_1$. In one example, $T_1$ is measured from start (or end) of the PDSCH transmission containing the MAC CE and that is positively acknowledged (positive HARQ-ACK). In another example, $T_1$ is measured from the start (or end) of the UL channel (e.g., PUCCH or PUSCH) that includes a positive HARQ-ACK for a DL transmission containing the MAC CE; and (2) in another example, the CSI-ResourcePeriodictyAndOffset (or CSI-RS resource set) corresponding to the code point becomes effective at the next activation of the semi-persistent CSI-RS resource by MAC CE.

If more than one code points are activated, a L1 control (e.g., DCI) message indicates which of the activated CSI-ResourcePeriodictyAndOffset (or CSI-RS resource set) code points to use.

In one example, the indicated CSI-ResourcePeriodicty-AndOffset (or CSI-RS resource set) code point by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, the acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In another example, the indicated CSI-ResourcePeriodictyAndOffset (or CSI-RS resource set) corresponding to the code point becomes effective at the next activation of the semi-persistent CSI-RS resource by MAC CE.

In one example, a MAC CE message for the activation of the semi-persistent CSI-RS resource activates code points that correspond to one or more of the configured CSI-ResourcePeriodictyAndOffset values (or CSI-RS resource sets). In case one code point is activated, the CSI-ResourcePeriodictyAndOffset (or CSI-RS resource set) corresponding to the code point is used, and becomes effective at the time of the activation of the semi-persistent CSI-RS resource.

If more than one code points are activated, a L1 control (e.g., DCI) message indicates which of the activated CSI-ResourcePeriodictyAndOffset (or CSI-RS resource set) code points to use.

In one example, the indicated CSI-ResourcePeriodicty-AndOffset (or CSI-RS resource set) code point by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, the acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In another example, the indicated CSI-ResourcePeriodictyAndOffset (or CSI-RS resource set) corresponding to the code point becomes effective at the next activation of the semi-persistent CSI-RS resource by MAC CE.

In one example, let the number of periodicities and offsets configured by CSI-ResourcePeriodictyAndOffset can be N (or the number of CSI-RS resource sets can be N). The configured periodicities and offsets (or CSI-RS resource sets) are $(P_0, O_0), (P_1, O_1), \ldots, (P_{N-1}, O_{N-1})$. At time $T_0$, periodicity and offset (or CSI-RS resource set) $(P_0, O_0)$ are used. At time $T_1$, periodicity and offset (or CSI-RS resource set) $(P_1, O_1)$ are used. At time $T_2$, periodicity and offset (or CSI-RS resource set) $(P_2, O_2)$ are used . . . . At time $T_{N-1}$, periodicity and offset (or CSI-RS resource set) $(P_{N-1}, O_{N-1})$ are used. In one example, $T_0<T_1 \ldots <T_{N-1}$. In one example, times $T_0, T_1, T_2, \ldots$ can be relative to the (re-)configuration message, i.e., measured from the (re-)configuration message. In another example, times $T_0, T_1, T_2, \ldots$ can be relative to the MAC CE activation message, i.e., measured from the MAC CE activation message. In another example, time $T_1, T_2, \ldots$ can be absolute times. In one example time $T_0$ is the time of the (re-)configuration message. In another example time $T_0$ is the time of the MAC CE activation message. In one example, $T_0, T_1, \ldots, T_{N-1}$ can be specified in the system specification and/or configured and/or updated by higher layer signaling. In one example, N=2. In one example, N=2 and $T_0$ is specified in the system specifications and $T_1$ is configured or updated by higher layer signaling. In one example, $T_0, T_1, \ldots, T_{N-1}$ depend on the sub-carrier spacing.

The gNB can configure CSI reports through CSI-ReportConfig with reportQuantity set to "cri-RSRP," "cri-SINR," "ssb-Index-RSRP," or "ssb-Index-SINR." These reports can be used by the network for beam management procedure.

In one example, the CSI-ReportConfig is configured with report configuration type "periodic." The CSI reports included in the CSI-ReportConfig are periodic resources that are configured with CSI-ReportPeriodicityAndOffset providing the periodicity and offset of the CSI report. The CSI report is configured with more than one CSI-ReportPeriodicityAndOffset. One of the more than one CSI-ReportPeriodicityAndOffset becomes effective at the time of (re-)configuration. In one example, the first CSI-ReportPeriodicityAndOffset in the list of CSI-ReportPeriodicityAndOffset is used at the time of (re-)configuration. In another example, the CSI-ReportPeriodicityAndOffset with the shortest (or longest) periodicity is used at the time of (re-)configuration. In another example, the (re-)configuration message of the CSI report includes an indication of the CSI-ReportPeriodicityAndOffset to use.

In one example, the CSI-ReportConfig is configured with report configuration type "periodic." The CSI-ReportConfig includes more than one resource sets for CSI reporting. One of the more than one resource sets for CSI reporting becomes effective at the time of (re-)configuration. In one example, the first resource set for CSI reporting is used at the time of (re-)configuration. In another example, the last resource set for CSI reporting is used at the time of (re-)configuration. In another example, the (re-)configuration message of the CSI report includes an indication of the resource set for CSI reporting to use In one example, a MAC CE message indicates which of the configured CSI-ReportPeriodicityAndOffset values (or resource sets for CSI reporting) to use. The indicated CSI-ReportPeriodicityAndOffset (or resource set for CSI reporting) by MAC CE becomes effective after a time $T_1$. In one example, $T_1$ is measured from start (or end) of the PDSCH transmission containing the MAC CE and that is positively acknowledged (positive HARQ-ACK). In another example, $T_1$ is measured from the start (or end) of the UL channel (e.g., PUCCH or PUSCH) that includes a positive HARQ-ACK for a DL transmission containing the MAC CE.

In one example, a L1 control (e.g., DCI) signal indicates which of the configured CSI-ReportPeriodicityAndOffset values (or resource sets for CSI reporting) to use. The indicated CSI-ReportPeriodicityAndOffset (or resource set for CSI reporting) by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, an acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In one example, a MAC CE activates code points that correspond to one or more of the configured CSI-ReportPeriodicityAndOffset values (or resource sets for CSI reporting). In case one code point is activated, the CSI-ReportPeriodicityAndOffset (or resource set for CSI reporting) corresponding to the code point is used, and becomes effective after a time $T_1$. In one example, $T_1$ is measured from start (or end) of the PDSCH transmission containing the MAC CE and that is positively acknowledged (positive HARQ-ACK). In another example, $T_1$ is measured from the start (or end) of the UL channel (e.g., PUCCH or PUSCH) that includes a positive HARQ-ACK for a DL transmission containing the MAC CE.

If more than one code points are activated, a L1 control (e.g., DCI) message indicates which of the activated CSI-ReportPeriodicityAndOffset (or resource sets for CSI reporting) code points to use. The indicated CSI-ReportPeriodicityAndOffset (or resource set for CSI reporting) by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, the acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In one example, separate lists of PUCCH resources are configured, with a one-to-one correspondence between a list of PUCCH resources (e.g., pucch-CSI-ResourceList) and a ReportPeriodicityAndOffset value (e.g., reportSlotConfig value).

In one example, one list of PUCCH resources is configured, the list is used for all ReportPeriodicityAndOffset values (e.g., reportSlotConfig values).

In one example, let the number of periodicities and offsets configured by CSI-ReportPeriodicityAndOffset can be N (or the number of resource sets for CSI reporting can be N). The configured periodicities and offsets (or resource sets for CSI reporting) are $(P_0, O_0), (P_1, O_1), \ldots, (P_{N-1}, O_{N-1})$. At time $T_0$, periodicity and offset (or resource set for CSI reporting) $(P_0, O_0)$ are used. At time $T_1$, periodicity and offset (or resource set for CSI reporting) $(P_1, O_1)$ are used. At time $T_2$, periodicity and offset (or resource set for CSI reporting) $(P_2, O_2)$ are used . . . . At time $T_{N-1}$, periodicity and offset (or resource set for CSI reporting) $(P_{N-1}, O_{N-1})$ are used. In one example, $T_0 < T_1 \ldots < T_{N-1}$. In one example, times $T_0, T_1, T_2, \ldots$ can be relative to the (re-)configuration message, i.e., measured from the (re-)configuration message. In another example, time $T_1, T_2, \ldots$ can be absolute times. In one example time $T_0$ is the time of the (re-)configuration message. In one example, $T_0, T_1, \ldots, T_{N-1}$ can be specified in the system specification and/or configured and/or updated by higher layer signaling. In one example, N=2. In one example, N=2 and $T_0$ is specified in the system specifications and $T_1$ is configured or updated by higher layer signaling. In one example, $T_0, T_1, \ldots, T_{N-1}$ depend on the sub-carrier spacing.

In one example, the CSI-ReportConfig is configured with report configuration type "semiPersistentonPUCCH." The CSI reports included in the CSI-ReportConfig are semi-persistent reports on PUCCH that are configured with CSI-ReportPeriodicityAndOffset providing the periodicity and offset of the CSI report. The CSI report is configured with more than one CSI-ReportPeriodicityAndOffset. One of the more than one CSI-ReportPeriodicityAndOffset becomes effective at the time of (re-)configuration to use at activation. In one example, the first CSI-ReportPeriodicityAndOffset in the list of CSI-ReportPeriodicityAndOffset is used at the time of activation by MAC CE. In another example, the CSI-ReportPeriodicityAndOffset with the shortest (or longest) periodicity is used at the time of activation by MAC CE. In another example, the (re-)configuration message of the CSI report includes an indication of the CSI-ReportPeriodicityAndOffset to use at the time of activation by MAC CE.

In one example, the CSI-ReportConfig is configured with report configuration type "semiPersistentonPUCCH." The CSI-ReportConfig includes more than one resource sets for CSI reporting. One of the more than one resource sets for CSI reporting becomes effective at the time of (re-)configuration to use at activation. In one example, the first resource set for CSI reporting is used at the time of activation by MAC CE. In another example, the last resource set for CSI reporting is used at the time of activation by MAC CE. In another example, the (re-)configuration message of the CSI report includes an indication of the resource set for CSI reporting to use at the time of activation by MAC CE.

In one example, a MAC CE message (separate from the MAC CE message activating the semi-persistent CSI report on PUCCH) indicates which of the configured CSI-ReportPeriodicityAndOffset values (or resource sets for CSI reporting) to use.

In one example, the indicated CSI-ReportPeriodicityAndOffset (or resource set for CSI reporting) by MAC CE becomes effective after a time $T_1$. In one example, $T_1$ is measured from start (or end) of the PDSCH transmission containing the MAC CE and that is positively acknowledged (positive HARQ-ACK). In another example, $T_1$ is measured from the start (or end) of the UL channel (e.g., PUCCH or PUSCH) that includes a positive HARQ-ACK for a DL transmission containing the MAC CE.

In another example, the indicated CSI-ReportPeriodicityAndOffset (or resource set for CSI reporting) by MAC CE becomes effective at the next activation of the semi-persistent CSI report on PUCCH by MAC CE.

In one example, a MAC CE message for the activation of the semi-persistent CSI report on PUCCH indicates which of the configured CSI-ReportPeriodicityAndOffset values (or resource sets for CSI reporting) to use. The indicated CSI-ReportPeriodicityAndOffset (or resource set for CSI reporting) by MAC CE becomes effective at the time of the activation of the semi-persistent CSI report on PUCCH.

In one example, a L1 control (e.g., DCI) signal indicates which of the configured CSI-ReportPeriodicityAndOffset values (or resource sets for CSI reporting) to use.

In one example, the indicated CSI-ReportPeriodicityAndOffset (or resource set for CSI reporting) by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, an acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In another example, the indicated CSI-ReportPeriodicityAndOffset (or resource set for CSI reporting) by DCI becomes effective at the next activation of the semi-persistent CSI report on PUCCH by MAC CE.

In one example, a MAC CE activates code points that correspond to one or more of the configured CSI-ReportPeriodicityAndOffset values (or resource sets for CSI reporting). In case one code point is activated: (1) in one example, the CSI-ReportPeriodicityAndOffset (or resource set for CSI reporting) corresponding to the code point is used, and becomes effective after a time $T_1$. In one example, $T_1$ is measured from start (or end) of the PDSCH transmission containing the MAC CE and that is positively acknowledged (positive HARQ-ACK). In another example, $T_1$ is measured from the start (or end) of the UL channel (e.g., PUCCH or PUSCH) that includes a positive HARQ-ACK for a DL transmission containing the MAC CE; and (2) in another example, the CSI-ReportPeriodicityAndOffset (or resource set for CSI reporting) corresponding to the code point becomes effective at the next activation of the semi-persistent CSI report on PUCCH by MAC CE.

If more than one code points are activated, a L1 control (e.g., DCI) signal indicates which of the activated CSI-ReportPeriodicityAndOffset (or resource set for CSI reporting) code points to use.

In one example, the indicated CSI-ReportPeriodicityAndOffset (or resource set for CSI reporting) code point by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, the acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In another example, the indicated CSI-ReportPeriodicityAndOffset (or resource set for CSI reporting) corresponding to the code point becomes effective at the next activation of the semi-persistent CSI report on PUCCH by MAC CE.

In one example, a MAC CE message for the activation of the semi-persistent CSI report on PUCCH activates code points that correspond to one or more of the configured CSI-ReportPeriodicityAndOffset values (or resource sets for CSI reporting). In case one code point is activated, the CSI-ReportPeriodicityAndOffset (or resource set for CSI reporting) corresponding to the code point is used, and becomes effective at the time of the activation of the semi-persistent CSI report on PUCCH.

If more than one code points are activated, a L1 control (e.g., DCI) message indicates which of the activated CSI-ReportPeriodicityAndOffset (or resource set for CSI reporting) code points to use.

In one example, the indicated CSI-ReportPeriodicityAndOffset (or resource set for CSI reporting) code point by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, the acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In another example, the indicated CSI-ReportPeriodicityAndOffset (or resource set for CSI reporting) corresponding to the code point becomes effective at the next activation of the semi-persistent CSI report on PUCCH by MAC CE.

In one example, separate lists of PUCCH resources are configured, with a one-to-one correspondence between a list of PUCCH resources (e.g., pucch-CSI-ResourceList) and a ReportPeriodicityAndOffset value (e.g., reportSlotConfig value).

In one example, one list of PUCCH resources is configured, the list is used for all ReportPeriodicityAndOffset values (e.g., reportSlotConfig values).

In one example, let the number of periodicities and offsets configured by CSI-ReportPeriodicityAndOffset can be N (or the number of resource sets for CSI reporting can be N). The configured periodicities and offsets (or resource sets for CSI reporting) are $(P_0, O_o), (P_1, O_1), \ldots, (P_{N-1}, O_{N-1})$. At time $T_0$, periodicity and offset (or resource set for CSI reporting) $(P_0, O_0)$ are used. At time $T_1$, periodicity and offset (or resource set for CSI reporting) $(P_1, O_1)$ are used. At time $T_2$, periodicity and offset (or resource set for CSI reporting) $(P_2, O_2)$ are used . . . . At time $T_{N-1}$, periodicity and offset (or resource set for CSI reporting) $(P_{N-1}, O_{N-1})$ are used. In one example, $T_0 < T_1 \ldots < T_{N-1}$. In one example, times $T_0, T_1, T_2, \ldots$ can be relative to the (re-)configuration message, i.e., measured from the (re-)configuration message. In another example, times $T_0, T_1, T_2, \ldots$ can be relative to the MAC CE activation message, i.e., measured from the MAC CE activation message. In another example, time $T_1, T_2, \ldots$ can be absolute times. In one example time $T_0$ is the time of the (re-)configuration message. In another example time $T_0$ is the time of the MAC CE activation message. In one example, $T_0, T_1, \ldots, T_{N-1}$ can be specified in the system specification and/or configured and/or updated by higher layer signaling. In one example, N=2. In one example, N=2 and $T_0$ is specified in the system specifications and $T_1$ is configured or updated by higher layer signaling. In one example, $T_0, T_1, \ldots, T_{N-1}$ depend on the sub-carrier spacing.

In one example, the CSI-ReportConfig is configured with report configuration type "semiPersistentonPUSCH." The CSI reports included in the CSI-ReportConfig are semi-persistent reports on PUSCH that are configured with reportSlotConfig and reportSlotOffsetList providing the periodicity and offset of the CSI report on PUSCH. The CSI report is configured with more than one reportSlotConfig. One of the more than one reportSlotConfig becomes effective at the time of (re-)configuration to use at activation. In one example, the first reportSlotConfig in the list of reportSlotConfig is used at the time of activation by DCI. In another example, the reportSlotConfig with the shortest (or longest) periodicity is used at the time of activation by DCI. In another example, the (re-)configuration message of the CSI report includes an indication of the reportSlotConfig to use at the time of activation by DCI.

In one example, the CSI-ReportConfig is configured with report configuration type "semiPersistentonPUSCH." The CSI-ReportConfig includes more than one resource sets for CSI reporting. One of the more than one resource sets for CSI reporting becomes effective at the time of (re-)configuration to use at activation. In one example, the first resource set for CSI reporting is used at the time of activation by DCI. In another example, the last resource set for CSI reporting is used at the time of activation by DCI. In another example, the (re-)configuration message of the CSI report includes an indication of the resource set for CSI reporting to use at the time of activation by DCI.

In one example, a MAC CE message indicates which of the configured reportSlotConfig values (or resource sets for CSI reporting) to use at the next activation of semi-persistent report on PUSCH.

In one example, a MAC CE message indicates which of the configured reportSlotConfig values (or resource sets for CSI reporting) to use, for example when semi-persistent reports on PUSCH are already active.

In one example, the indicated reportSlotConfig (or resource set for CSI reporting) by MAC CE becomes effective after a time $T_1$. In one example, $T_1$ is measured from start (or end) of the PDSCH transmission containing the MAC CE and that is positively acknowledged (positive HARQ-ACK). In another example, $T_1$ is measured from the start (or end) of the UL channel (e.g., PUCCH or PUSCH) that includes a positive HARQ-ACK for a DL transmission containing the MAC CE.

In another example, the indicated reportSlotConfig (or resource set for CSI reporting) by MAC CE becomes effective at the next activation of the semi-persistent CSI report on PUSCH by DCI.

In one example, a L1 control (e.g., DCI) signal (separate from the DCI signal activating the semi-persistent CSI report on PUSCH) indicates which of the configured reportSlotConfig values (or resource sets for CSI reporting) to use.

In one example, the indicated reportSlotConfig (or resource set for CSI reporting) by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, an acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In another example, the indicated reportSlotConfig (or resource set for CSI reporting) by DCI becomes effective at the next activation of the semi-persistent CSI report on PUSCH by DCI.

In one example, a DCI signal for the activation of the semi-persistent CSI report on PUSCH indicates which of the configured reportSlotConfig values (or resource sets for CSI reporting) to use. The indicated reportSlotConfig (or resource set for CSI reporting) by DCI becomes effective at the time of the activation of the semi-persistent CSI report on PUSCH.

In one example, a MAC CE activates code points that correspond to one or more of the configured CSI-reportSlotConfig values (or resource sets for CSI reporting). In case one code point is activated: (1) in one example, the reportSlotConfig (or resource set for CSI reporting) corresponding to the code point is used, and becomes effective after a time $T_1$. In one example, $T_1$ is measured from start (or end) of the PDSCH transmission containing the MAC CE and that is positively acknowledged (positive HARQ-ACK). In another example, $T_1$ is measured from the start (or end) of the UL channel (e.g., PUCCH or PUSCH) that includes a positive HARQ-ACK for a DL transmission containing the MAC CE; (2) in another example, the reportSlotConfig (or resource set for CSI reporting) corresponding to the code point becomes effective at the next activation of the semi-persistent CSI report on PUSCH by DCI.

If more than one code points are activated, a L1 control (e.g., DCI) signal (separate from the DCI signal activating the semi-persistent CSI report on PUSCH) indicates which of the activated CSI-reportSlotConfig (or resource set for CSI reporting) code points to use.

In one example, the indicated reportSlotConfig (or resource set for CSI reporting) code point by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, the acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In another example, the indicated reportSlotConfig (or resource set for CSI reporting) corresponding to the code point becomes effective at the next activation of the semi-persistent CSI report on PUSCH by DCI.

In one example, a MAC CE activates code points that correspond to one or more of the configured reportSlotConfig values (or resource sets for CSI reporting). In case one code point is activated, the reportSlotConfig (or resource set for CSI reporting) corresponding to the code point is used at the next activation of semi-persistent report on PUSCH. If more than one code points are activated, a DCI signal for the activation of the semi-persistent CSI report on PUSCH indicates which of the activated reportSlotConfig (or resource set for CSI reporting) code points to use. The indicated reportSlotConfig (or resource set for CSI reporting) code point by DCI becomes effective at the time of the activation of the semi-persistent CSI report on PUSCH.

In one example, a MAC CE activates code points that correspond to one or more of the configured CSI-reportSlotConfig values (or resource sets for CSI reporting). In case one code point is activated: (1) in one example, the reportSlotConfig (or resource set for CSI reporting) corresponding to the code point is used (for example when semi-persistent reports on PUSCH are already active), and becomes effective after a time $T_1$. In one example, $T_1$ is measured from start (or end) of the PDSCH transmission containing the MAC CE and that is positively acknowledged (positive HARQ-ACK). In another example, $T_1$ is measured from the start (or end) of the UL channel (e.g., PUCCH or PUSCH) that includes a positive HARQ-ACK for a DL transmission containing the MAC CE; and (2) in another example, the reportSlotConfig (or resource set for CSI reporting) corresponding to the code point becomes effective at the next activation of the semi-persistent CSI report on PUSCH by DCI.

If more than one code points are activated, a DCI signal for the activation of the semi-persistent CSI report on PUSCH indicates which of the activated reportSlotConfig (or resource set for CSI reporting) code points to use. The reportSlotConfig (or resource set for CSI reporting) code point by DCI becomes effective at the time of the activation of the semi-persistent CSI report on PUSCH.

In one example, separate lists of slot offsets are configured, with a one-to-one correspondence between a list of slot offsets (e.g., reportSlotOffsetList) and a slot offset value (e.g., reportSlotConfig value).

In one example, one list of slot offsets is configured, the list is used for all slots offset values (e.g., reportSlotConfig values).

In one example, let the number of periodicities and slot offset lists configured by reportSlotConfig and reportSlotOffsetList can be N (or the number of resource sets for CSI reporting can be N). The configured periodicities and offset lists are $(P_0, O_o), (P_1, O_1), \ldots, (P_{N-1}, O_{N-1})$. At time $T_0$, periodicity and offset list (or resource set for CSI reporting) $(P_0, O_0)$ are used. At time $T_1$, periodicity and offset list (or resource set for CSI reporting) $(P_1, O_1)$ are used. At time $T_2$, periodicity and offset list (or resource set for CSI reporting) $(P_2, O_2)$ are used . . . . At time $T_{N-1}$, periodicity and offset list (or resource set for CSI reporting) $(P_{N-1}, O_{N-1})$ are used. In one example, $T_0 < T_1 \ldots < T_{N-1}$. In one example, times $T_0$, $T_1, T_2, \ldots$ can be relative to the (re-)configuration message, i.e., measured from the (re-)configuration message. In another example, times $T_0, T_1, T_2, \ldots$ can be relative to the DCI activation signal, i.e., measured from the DCI activation signal. In another example, time $T_1, T_2, \ldots$ can be absolute times. In one example time $T_0$ is the time of the (re-)configuration message. In another example time $T_0$ is the time of the DCI activation signal. In one example, $T_0$, $T_1, \ldots, T_{N-1}$ can be specified in the system specification and/or configured and/or updated by higher layer signaling. In one example, N=2. In one example, N=2 and $T_0$ is specified in the system specifications and $T_1$ is configured or updated by higher layer signaling. In one example, $T_0$, $T_1, \ldots, T_{N-1}$ depend on the sub-carrier spacing.

UL reference signals used for beam measurement can include; SRS.

In one example, the SRS-ResourceSet (e.g., with usage configured as "beamManagement") is configured with resource type "periodic." The SRS resources included in the SRS-Resource are periodic resources that are configured with SRS-PeriodicityAndOffset providing the periodicity and offset of the SRS resource. The SRS resource is configured with more than one SRS-PeriodicityAndOffset. One of the more than one SRS-PeriodicityAndOffset becomes effective at the time of (re-)configuration. In one example, the first SRS-PeriodicityAndOffset in the list of SRS-PeriodicityAndOffset is used at the time of (re-)configuration. In another example, the SRS-PeriodicityAndOffset with the shortest (or longest) periodicity is used at the time of (re-)configuration. In another example, the (re-)configuration message of the SRS resource includes an indication of the SRS-PeriodicityAndOffset to use.

In one example, multiple SRS resources or multiple SRS resource sets (e.g., with usage configured as "beamManagement") are configured with resource type "periodic." One of the more than one SRS resources or SRS resource sets becomes effective at the time of (re-)configuration. In one example, the first SRS resource or SRS resource set is used at the time of (re-)configuration. In another example, the last SRS resource or SRS resource set is used at the time of (re-)configuration. In another example, the (re-)configuration message of the SRS resource includes an indication of the SRS resource or SRS resource set to use In one example, a MAC CE message indicates which of the configured SRS-PeriodicityAndOffset values (or SRS resources or SRS resource sets) to use. The indicated SRS-PeriodicityAndOffset (or SRS resource or SRS resource set) by MAC CE becomes effective after a time $T_1$. In one example, $T_1$ is measured from start (or end) of the PDSCH transmission containing the MAC CE and that is positively acknowledged (positive HARQ-ACK). In another example, $T_1$ is measured from the start (or end) of the UL channel (e.g., PUCCH or PUSCH) that includes a positive HARQ-ACK for a DL transmission containing the MAC CE.

In one example, a L1 control (e.g., DCI) signal indicates which of the configured SRS-PeriodicityAndOffset values (or SRS resources or SRS resource sets) to use. The indicated SRS-PeriodicityAndOffset (or SRS resource or SRS resource set) by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, an acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In one example, a MAC CE activates code points that correspond to one or more of the configured SRS-PeriodicityAndOffset values (or SRS resources or SRS resource sets). In case one code point is activated, the SRS-PeriodicityAndOffset (or SRS resource or SRS resource set) corresponding to the code point is used, and becomes effective after a time $T_1$. In one example, $T_1$ is measured from start (or end) of the PDSCH transmission containing the MAC CE and that is positively acknowledged (positive HARQ-ACK). In another example, $T_1$ is measured from the start (or end) of the UL channel (e.g., PUCCH or PUSCH) that includes a positive HARQ-ACK for a DL transmission containing the MAC CE.

If more than one code points are activated, a L1 control (e.g., DCI) message indicates which of the activated SRS-PeriodicityAndOffset (or SRS resource or SRS resource set) code points to use. The indicated SRS-PeriodicityAndOffset (or SRS resource or SRS resource set) by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, the acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In one example, let the number of periodicities and offsets configured by SRS-PeriodicityAndOffset can be N (or the number of SRS resources or SRS resource sets can be N). The configured periodicities and offsets (or SRS resources or SRS resource sets) are $(P_0, O_o), (P_1, O_1), \ldots, (P_{N-1}, O_{N-1})$. At time $T_0$, periodicity and offset (or SRS resource or SRS resource set) $(P_0, O_0)$ are used. At time $T_1$, periodicity and offset (or SRS resource or SRS resource set) $(P_1, O_1)$ are used. At time $T_2$, periodicity and offset (or SRS resource or SRS resource set) $(P_2, O_2)$ are used . . . . At time $T_{N-1}$, periodicity and offset (or SRS resource or SRS resource set) $(P_{N-1}, O_{N-1})$ are used. In one example, $T_0 < T_1 \ldots < T_{N-1}$. In one example, times $T_0, T_1, T_2, \ldots$ can be relative to the (re-)configuration message, i.e., measured from the (re-)configuration message. In another example, time $T_1$, $T_2, \ldots$ can be absolute times. In one example time $T_0$ is the time of the (re-)configuration message. In one example, $T_0$, $T_1, \ldots, T_{N-1}$ can be specified in the system specification and/or configured and/or updated by higher layer signaling. In one example, N=2. In one example, N=2 and $T_0$ is specified in the system specifications and $T_1$ is configured or updated by higher layer signaling. In one example, $T_0$, $T_1, \ldots, T_{N-1}$ depend on the sub-carrier spacing.

In one example, the SRS-ResourceSet (e.g., with usage configured as "beamManagement") is configured with resource type "semiPersistent." The SRS resources included in the SRS-Resource are semi-persistent resources that are configured with SRS-PeriodicityAndOffset providing the periodicity and offset of the SRS resource. The SRS resource is configured with more than one SRS PeriodicityAndOffset. One of the more than one SRS-PeriodicityAndOffset becomes effective at the time of (re-)configuration to use at activation. In one example, the first SRS-PeriodicityAndOffset in the list of SRS-PeriodicityAndOffset is used at the time of activation by MAC CE. In another example, the SRS-PeriodicityAndOffset with the shortest (or longest) periodicity is used at the time of activation by MAC CE. In another example, the (re-)configuration message of the SRS resource includes an indication of the SRS-PeriodicityAndOffset to use at the time of activation by MAC CE.

In one example, multiple SRS resources or multiple SRS resource sets (e.g., with usage configured as "beamManagement") are configured with resource type "semiPersistent." One of the more than one SRS resources or SRS resource sets becomes effective at the time of (re-)configuration to use at activation. In one example, the first SRS resource or SRS resource set is used at the time of activation by MAC CE. In another example, the last SRS resource or SRS resource set is used at the time of activation by MAC CE. In another example, the (re-)configuration message of the SRS resource includes an indication of the SRS resource or SRS resource set to use at the time of activation by MAC CE.

In one example, a MAC CE message (separate from the MAC CE message activating the semi-persistent SRS resource) indicates which of the configured SRS-PeriodicityAndOffset values (or SRS resources or SRS resource sets) to use.

In one example, the indicated SRS-PeriodicityAndOffset (or SRS resource or SRS resource set) by MAC CE becomes effective after a time $T_1$. In one example, $T_1$ is measured from start (or end) of the PDSCH transmission containing the MAC CE and that is positively acknowledged (positive HARQ-ACK). In another example, $T_1$ is measured from the start (or end) of the UL channel (e.g., PUCCH or PUSCH) that includes a positive HARQ-ACK for a DL transmission containing the MAC CE.

In another example, the indicated SRS-PeriodicityAndOffset (or SRS resource or SRS resource set) by MAC CE becomes effective at the next activation of the semi-persistent SRS resource by MAC CE.

In one example, a MAC CE message for the activation of the semi-persistent SRS resource indicates which of the configured SRS-PeriodicityAndOffset values (or SRS resources or SRS resource sets) to use. The indicated SRS-PeriodicityAndOffset (or SRS resource or SRS resource set) by MAC CE becomes effective at the time of the activation of the semi-persistent SRS resource.

In one example, a L1 control (e.g., DCI) signal indicates which of the configured SRS-PeriodicityAndOffset values (or SRS resources or SRS resource sets) to use.

In one example, the indicated SRS-PeriodicityAndOffset (or SRS resource or SRS resource set) by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, an acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In another example, the indicated SRS-PeriodicityAndOffset (or SRS resource or SRS resource set) by DCI becomes effective at the next activation of the semi-persistent SRS resource by MAC CE.

In one example, a MAC CE activates code points that correspond to one or more of the configured SRS-PeriodicityAndOffset values (or SRS resources or SRS resource sets). In case one code point is activated: (1) in one example, the SRS-PeriodicityAndOffset (or SRS resource or SRS resource set) corresponding to the code point is used, and becomes effective after a time $T_1$. In one example, $T_1$ is measured from start (or end) of the PDSCH transmission containing the MAC CE and that is positively acknowledged (positive HARQ-ACK). In another example, $T_1$ is measured from the start (or end) of the UL channel (e.g., PUCCH or PUSCH) that includes a positive HARQ-ACK for a DL transmission containing the MAC CE; and (2) in another example, the SRS-PeriodicityAndOffset (or SRS resource or SRS resource set) corresponding to the code point becomes effective at the next activation of the semi-persistent SRS resource by MAC CE.

If more than one code points are activated, a L1 control (e.g., DCI) message indicates which of the activated SRS-PeriodicityAndOffset (or SRS resource or SRS resource set) code points to use.

In one example, the indicated SRS-PeriodicityAndOffset (or SRS resource or SRS resource set) code point by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, the acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In another example, the indicated SRS-PeriodicityAndOffset (or SRS resource or SRS resource set) corresponding to the code point becomes effective at the next activation of the semi-persistent SRS resource by MAC CE.

In one example, a MAC CE message for the activation of the semi-persistent SRS resource activates code points that correspond to one or more of the configured SRS-PeriodicityAndOffset values (or SRS resources or SRS resource sets). In case one code point is activated, the SRS-PeriodicityAndOffset (or SRS resource or SRS resource set) corresponding to the code point is used, and becomes effective at the time of the activation of the semi-persistent SRS resource.

If more than one code points are activated, a L1 control (e.g., DCI) message indicates which of the activated SRS-PeriodicityAndOffset (or SRS resource or SRS resource set) code points to use.

In one example, the indicated SRS-PeriodicityAndOffset (or SRS resource or SRS resource set) code point by DCI becomes effective after a time $T_1$. In one example, $T_1$ is measured from start (or end) of the PDCCH transmission containing the DCI and that is acknowledged. In another example, $T_1$ is measured from the start (or end) of the UL channel (e.g., PUCCH or PUSCH) that includes the HARQ-ACK corresponding to the PDCCH transmission containing the DCI. In one example, the acknowledgment can be a positive acknowledgment. In another example, an acknowledgment can be a positive or a negative acknowledgment (a negative acknowledgment can indicate that the PDCCH is received but not the corresponding PDSCH), in this case the negative acknowledgment does not include DTX.

In another example, the indicated SRS-PeriodicityAndOffset (or SRS resource or SRS resource set) corresponding to the code point becomes effective at the next activation of the semi-persistent SRS resource by MAC CE.

In one example, let the number of periodicities and offsets configured by SRS-PeriodicityAndOffset can be N (or the number of SRS resources or SRS resource sets can be N). The configured periodicities and offsets (or SRS resources or SRS resource sets) are $(P_0, O_0), (P_1, O_1), \ldots, (P_{N-1}, O_{N-1})$. At time $T_0$, periodicity and offset (or SRS resource or SRS resource set) $(P_0, O_0)$ are used. At time $T_1$, periodicity and offset (or SRS resource or SRS resource set) $(P_1, O_1)$ are used. At time $T_2$, periodicity and offset (or SRS resource or SRS resource set) $(P_2, O_2)$ are used . . . . At time $T_{N-1}$, periodicity and offset (or SRS resource or SRS resource set) $(P_{N-1}, O_{N-1})$ are used. In one example, $T_0 < T_1 \ldots < T_{N-1}$. In one example, times $T_0, T_1, T_2, \ldots$ can be relative to the (re-)configuration message, i.e., measured from the (re-)configuration message. In another example, times $T_0, T_1, T_2, \ldots$ can be relative to the MAC CE activation message, i.e., measured from the MAC CE activation message. In another example, time $T_1, T_2, \ldots$ can be absolute times.

In one example time $T_0$ is the time of the (re-)configuration message. In another example time $T_0$ is the time of the MAC CE activation message. In one example, $T_0, T_1, \ldots, T_{N-1}$ can be specified in the system specification and/or configured and/or updated by higher layer signaling. In one example, N=2. In one example, N=2 and $T_0$ is specified in the system specifications and $T_1$ is configured or updated by higher layer signaling. In one example, $T_0, T_1, \ldots, T_{N-1}$ depend on the sub-carrier spacing.

To address these points, the present disclosure provides configuring RS resources with more than one periodicity (or more than one set of resources), and configuring beam reports with more than one periodicity (or more than one set of resources). The network can signal one of the configured periodicities (or set of resources) to the UE through dynamic signaling such as MAC CE signaling and DCI signaling. The benefit of this scheme is that it may allow for fast adaptation of the beam measurement and reporting periodicity (or resources) as the channel conditions changes and/or as the requirements of the beam prediction algorithm for beam measurements changes.

A set of measurement reference signals can be configured by RRC or SIB signaling. A set or subset of measurement reference signal can be activated or signaled by MAC CE signaling. A set or subset of measurement reference signals can be indicated or signaled by L1 control (e.g., DCI) signaling. The measurement reference signals can be reference signal resources used by the UE for beam measurement and beam reporting to the network. Wherein, a beam measurement report can include a beam measurement reference signal indicator (ID) or index and a corresponding quality metric, where the quality metric can be one or more of: L1-RSRP, L1-SINR, virtual L1 BLER (e.g., BLER of a reference transmission), CQI, L3 RSRP (e.g., time-filter RSRP using an exponential averaging filtering or a sliding window filter or some other time domain filter). In one example, the beam measurement report uses differential reporting, the first pair of measurement RS ID and quality metric includes the best (e.g., strongest) quality metric.

Subsequent pairs of measurement RS ID and quality metric include a differential quality metric, e.g., ratio to or difference with the best quality metric. For example, if the quality metric is RSRP in dB, the quality metric for any pair other that the first pair is the difference between the RSRP of that pair and the strongest RSRP in dB. In another example, the beam measurement report uses absolute reporting for the metric (can also be in dB), each pair includes measurement RS ID and quality metric (not a relative or differential quality metric). In another example, the beam measurement report includes both differential and relative reporting as previously described as well as absolute reporting as previously described.

Figure 9:
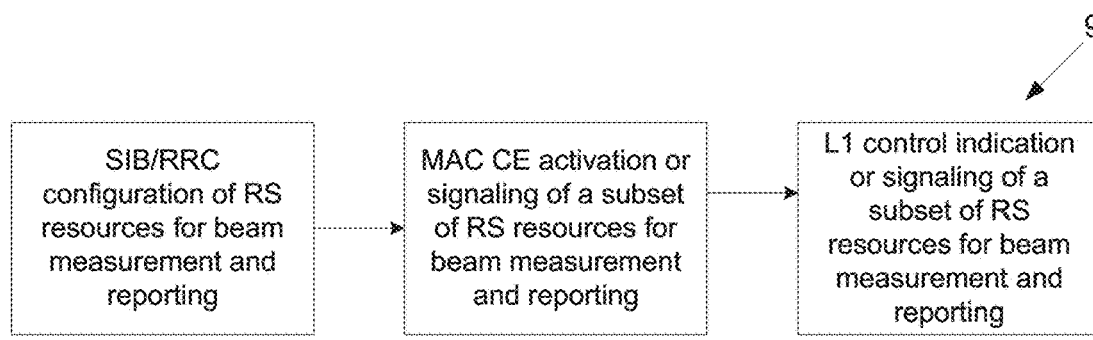
FIG. 9 illustrates an example of configuration and indication of measurement according to embodiments of the present disclosure.

FIG. 9 illustrates an example of configuration and indication of measurement 900 according to embodiments of the present disclosure. An embodiment of the configuration and indication of measurement 900 shown in FIG. 9 is for illustration only.

FIG. 9 illustrates an example of configuration and indication of measurement RS based on (1) RRC and/or SIB signaling; (2) MAC CE signaling; (3) L1 control signaling.

In one example, the configuration and indication of measurement RS includes: (1) RRC and/or SIB signaling; (2) MAC CE signaling; and (3) L1 control signaling. For example, RRC and/or SIB signaling configures a set of reference signals that can be used for example for beam measurement and beam reporting. MAC CE activates or a signals a subset of the RRC/SIB configured set. L1 control (e.g., DCI) signaling further indicates or signals a subset of the MAC-CE signaled subset. The subset indicated or signaled by L1 control is used by the UE for beam measurement and beam reporting.

In one example, the configuration and indication of measurement RS includes: (1) RRC and/or SIB signaling; and (2) MAC CE signaling. For example, RRC and/or SIB signaling configures a set of reference signals that can be used for example for beam measurement and beam reporting. MAC CE activates or a signals a subset of the RRC/SIB configured set. The subset activated or signaled by MAC CE signaling is used by the UE for beam measurement and beam reporting.

In one example, the configuration and indication of measurement RS includes: (1) RRC and/or SIB signaling; and (2) L1 control signaling. For example, RRC and/or SIB signaling configures a set of reference signals that can be used for example for beam measurement and beam reporting. L1 control (e.g., DCI) signaling indicates or signals a subset of the RRC/SIB configured set. The subset indicated or signaled by L1 control is used by the UE for beam measurement and beam reporting.

In one example, the configuration and indication of measurement RS includes: (1) RRC and/or SIB signaling. For example, RRC and/or SIB signaling configures a set of reference signals that can be used for example for beam measurement and beam reporting. The RRC/SIB configured set is used by the UE for beam measurement and beam reporting.

In one example, the configuration of RS resources for beam measurement and reporting is by SIB (system information block) signaling. For example, the RS resources are included in SIB1 (e.g., part of the remaining minimum system information (RMSI)). In one example, RS resources configured by SIB is common for all UEs in a cell. In another example, the RS resources configured by SIB is common for a subset of UEs in a cell, different subsets of UEs can have different RS resources configured.

In one example, the configuration of RS resources for beam measurement and reporting is by RRC signaling. In one example, the RRC signaling can be dedicated to one UE. In another example, the RRC signaling is group-common RRC signaling to a group of UEs in a cell. In one example, the group of UEs in a cell are all UEs in the cell.

In one example, the configuration of RS resources for beam measurement and reporting is by SIB signaling and RRC signaling. For example, the RS resources are included in SIB1 (e.g., part of the remaining minimum system information (RMSI)). In one example, a set of RS resources is configured by SIB signaling and is further refined by RRC signaling. In one example, a set of default RS resources is configured by SIB signaling, if another set of RS resources is configured by RRC signaling for a UE or a group of UEs, the later set is used by the UE or by the group of UEs. In one example, the SIB signaling includes a bitmap of RS resources or a set of RS resource IDs or indices, RS resources are configured by RRC signaling.

In one example, RS resources configured by SIB is common for all UEs in a cell. In another example, the RS resources configured by SIB is common for a subset of UEs in a cell, different subsets of UEs can have different RS resources configured. In one example, the RRC signaling can be dedicated to one UE. In another example, the RRC signaling is group-common RRC signaling to a group of UEs in a cell. In one example, the group of UEs in a cell are all UEs in the cell.

In one example, the RS resources are configured for beam measurement and beam reporting In one example, the RS resources are configured for beam measurement and beam reporting and other purposes.

In one example, a set of RS resources are configured, and a subset of the set is configured or signaled for beam measurement and beam reporting.

In one example, a subset of RS resources is activated or signaled by MAC CE signaling. The subset of RS resource is used for beam measurement and beam reporting. The subset of RS resources is from a set of SIB/RRC configured RS resources. The MAC CE signaling is UE-dedicated MAC CE signaling, e.g., MAC CE signaling dedicated to a specific UE.

In one example, a subset of RS resources is activated or signaled by MAC CE signaling. The subset of RS resource is used for beam measurement and beam reporting. The subset of RS resources is from a set of SIB/RRC configured RS resources. The MAC CE signaling is UE-group MAC CE signaling, e.g., MAC CE signaling to a group of UEs. In one example, the group of UEs are in a cell. In one example, the group of UEs are all UEs in a cells. In one example, the group of UEs are in more than one cell. In one example, the group of UEs are all UEs in more than one cell.

In one example, there is no MAC CE signaling to activate or signal a set of resource for beam measurement and beam reporting.

In one example, the MAC CE activated reference signal resources are indicated by a bitmap, with one bit for each RRC/SIB configured reference signal resource. A bit is set to one if the reference signal resource is activated, otherwise the bit is set to zero (or vice versa).

In one example, the MAC CE activated reference signal resources are indicated as a list of reference signal resource ID or index. The reference signal resource ID or index is that of the RRC/SIB configured reference signal resource.

In one example, the list of RS resources can be partitioned into groups fixed in the specifications, for example, the list of RS resources can be partitioned into M groups. Wherein, M is specified in the system specifications and/or configured or updated by RRC signaling and/or MAC CE signaling and/or L1 control (e.g., DCI) signaling. In one example, M=2. The resource can be partitioned such that: (1) first group includes resources with resource index I satisfying: (I % M)=0. Where, % is the modulo division operator, that returns the remainder when dividing two integers; (2) second group includes resources with resource index I satisfying: (I % M)=1 . . . (3) last group includes resources with resource index I satisfying: (I % M)=M−1.

In one example, when M=2, the first group is the RS resources with even index or ID, the second group is RS resources with odd index or ID.

In one example, the RS resources in each of the M groups is configured or updated by RRC signaling and/or MAC CE signaling and/or L1 control (e.g., DCI signaling).

In one example, the number of measurement RS resources in each group is the same. In another example, the number of measurement RS resources in each group can be different.

In one example, the UE can be indicated by MAC CE signaling which of the M groups of measurement RS resources to use for beam measurement and beam reporting. In one example, the UE is indicated one of the M groups to use. In another example, the UE can be indicated one or more of the M groups to be used, for example, this can be by a bitmap with M bits (one bit for each group) and the corresponding bit is set to "1" when the group is to be used and zero otherwise (or vice versa), in another example, a list of the groups to be used is signaled to the UE. In one example, the MAC CE signaling to the UE can be through UE dedicated signaling, e.g., the channel conveying the group or groups of measurement RS resources to be used is transmitted to one UE. In another example, the MAC CE signaling to the UE can be through group common signaling, e.g., the channel conveying the group or groups of measurement RS resources to be used is transmitted to a group of UEs.

In one example, a subset of RS resources is indicated or signaled by L1 control signaling (e.g., DCI signaling). The subset of RS resource is used for beam measurement and beam reporting. In one example, the subset of RS resources is from a set of SIB/RRC configured RS resources. In one example, the subset of RS resources is from a set or subset of MAC CE activated or signaled RS resources. The L1 control signaling (e.g., DCI signaling) is UE-dedicated L1 control signaling (e.g., DCI signaling), e.g., DCI signaling dedicated to a specific UE, with CRC scrambled by a UE-specific RNTI.

In one example, a subset of RS resources is indicated or signaled by L1 control signaling (e.g., DCI signaling). The subset of RS resource is used for beam measurement and beam reporting. In one example, the subset of RS resources is from a set of SIB/RRC configured RS resources. In one example, the subset of RS resources is from a set or subset of MAC CE activated or signaled RS resources. The L1 control signaling (e.g., DCI signaling) is UE-group L1 control signaling (e.g., DCI signaling), e.g., DCI to a group of UEs, with CRC scramble by a group-common RNTI. In one example, the group of UEs are in a cell. In one example, the group of UEs are all UEs in a cells. In one example, the group of UEs are in more than one cell. In one example, the group of UEs are all UEs in more than one cell.

In one example, there is no L1 control signaling (e.g., DCI signaling) to activate or signal a set of resource for beam measurement and beam reporting.

In one example, the L1 control (e.g., DCI) indicated reference signal resources are indicated by a bitmap, with one bit for each MAC CE-activated reference signal resource. A bit is set to one if the reference signal resource is indicated, otherwise the bit is set to zero (or vice versa).

In one example, the L1 control (e.g., DCI) indicated reference signal resources are indicated as a list of reference signal resource ID or index. The reference signal resource ID or index is that of the MAC CE-activated reference signal resource.

In one example, the L1 control (e.g., DCI) indicated reference signal resources are indicated by a bitmap, with one bit for each RRC/SIB configured reference signal resource. A bit is set to one if the reference signal resource is indicated, otherwise the bit is set to zero (or vice versa).

In one example, the L1 control (e.g., DCI) indicated reference signal resources are indicated as a list of reference signal resource ID or index. The reference signal resource ID or index is that of the RRC/SIB configured reference signal resource.

In one example, the list of RS resources can be partitioned into groups fixed in the specifications, for example, the list of RS resources can be partitioned into M groups. Wherein, M is specified in the system specifications and/or configured or updated by RRC signaling and/or MAC CE signaling and/or L1 control (e.g., DCI) signaling. In one example, M=2. The resources can be partitioned such that: (1) a first group includes resources with resource index I satisfying: (I % M)=0. Where, % is the modulo division operator, that returns the remainder when dividing two integers; (2) a second group includes resources with resource index I satisfying: (I % M)=1 . . . (3) a last group includes resources with resource index I satisfying: (I % M)=M−1.

In one example, when M=2, the first group is the RS resources with even index or ID, the second group is RS resources with odd index or ID.

In one example, the RS resources in each of the M groups is configured or updated by RRC signaling and/or MAC CE signaling and/or L1 control (e.g., DCI signaling).

In one example, the number of measurement RS resources in each group is the same. In another example, the number of measurement RS resources in each group can be different.

In one example, the UE can be indicated by L1 control (e.g., DCI) signaling which of the M groups of measurement RS resources to use for beam measurement and beam reporting. In one example, the UE is indicated one of the M groups to use. In another example, the UE can be indicated one or more of the M groups to be used, for example, this can be by a bitmap with M bits (one bit for each group) and the corresponding bit is set to "1" when the group is to be used and zero otherwise (or vice versa), in another example, a list of the groups to be used is signaled to the UE. In one example, the L1 control (e.g., DCI) signaling to the UE can be through UE dedicated signaling, e.g., the channel conveying the group or groups of measurement RS resources to be used is transmitted to one UE. In another example, the L1 control (e.g., DCI) signaling to the UE can be through group common signaling, e.g., the channel conveying the group or groups of measurement RS resources to be used is transmitted to a group of UEs.

Figure 10:
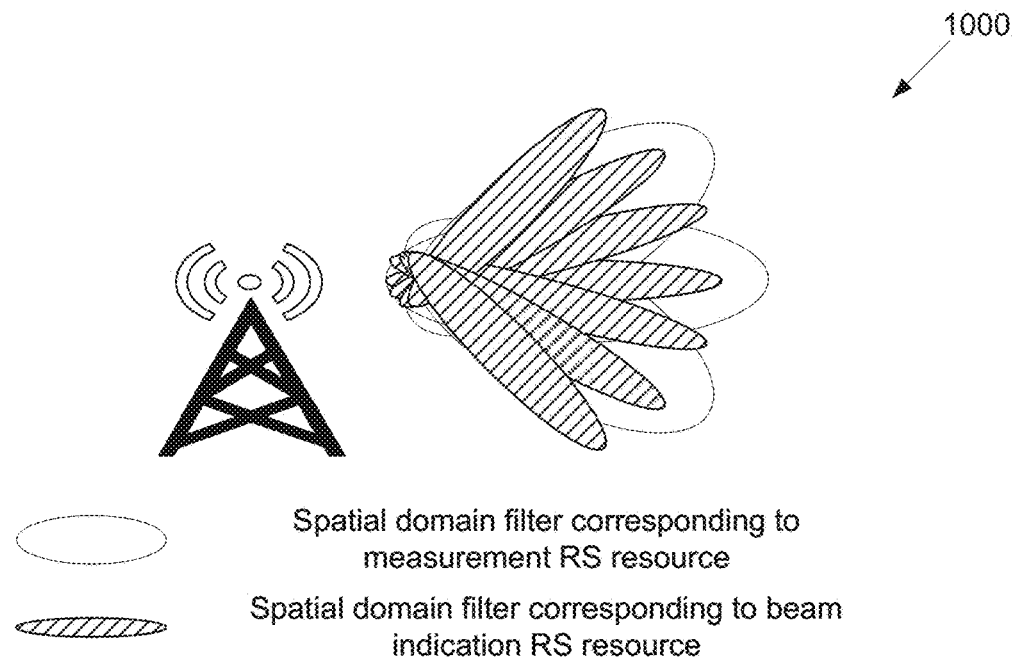
FIG. 10 illustrates an example of spatial domain filter corresponding to measurement RS resources and beam indication RS resources according to embodiments of the present disclosure.

FIG. 10 illustrates an example of spatial domain filter corresponding to measurement RS resources and beam indication RS resources 1000 according to embodiments of the present disclosure. An embodiment of the spatial domain filter corresponding to measurement RS resources and beam indication RS resources 1000 shown in FIG. 10 is for illustration only.

Figure 11:
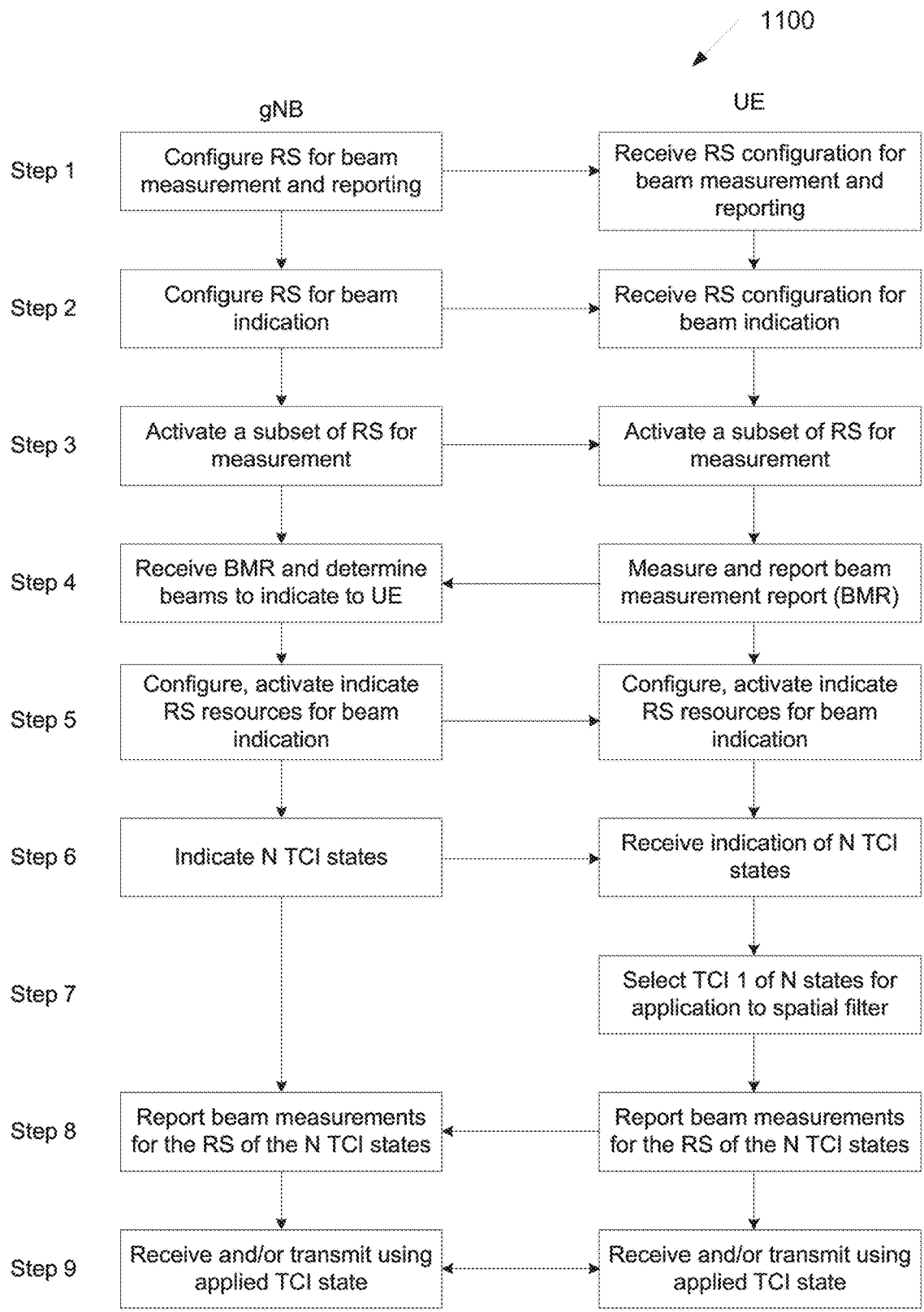
FIG. 11 illustrates a flowchart of a method for a spatial domain receive filter and/or a spatial domain transmit filter according to embodiments of the present disclosure.

FIG. 11 illustrates a flowchart of a method 1100 for a spatial domain receive filter and/or a spatial domain transmit filter according to embodiments of the present disclosure. The method 1100 as may be performed by a UE (e.g., 111-116 as illustrated in FIG. 1) and a BS (e.g., 101-103 as illustrated in FIG. 1). An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

FIG. 11 illustrates an example procedure where a UE is indicated multiple TCI states and selects a TCI state for application to a spatial domain receive filter and/or a spatial domain transmit filter.

In step 1, the gNB configures the UE with reference signal resources that can be used for beam measurement and beam measurement reporting. The configuration can be by RRC signaling and/or by SIB (system information block) signaling. The UE receives this configuration from the gNB.

In one example, a network can indicate to the UE that the measurement RS resources (e.g., used for beam measurement and beam reporting) are different from the RS resources that can be used for beam indication (e.g., used as source RS of QCL Type D in a TCI state, or used as spatial relation RS in a TCI state). For example, the measurement RS resource set or list or group can be a smaller set or list or group than the RS resource set or list or group used for beam indication. In one example, spatial domain filters (e.g., beams) associated with the measurement RS resources can correspond to wider or sparser spatial domain filters (e.g., beams) than the spatial domain filters (e.g., beams) associated with RS resources used for beam indication, i.e., the spatial domain filters (e.g., beams) for RS resources for beam indication are narrower or denser. An example is illustrated in FIG. 10.

In one example, the network can interpolate the beam measurement report results to find one or more spatial domain filters (e.g., beams) and their corresponding RS resources for beam indication to indicate to the UE. In one example, the network can predict from the beam measurement report results one or more spatial domain filters (e.g., beams) and their corresponding RS resources for beam indication to indicate to the UE. In one example, by indicating to UE that the measurement RS resources are different from the RS resources that can be used for beam indication, the UE can provide or report additional information to facilitate the interpolation and/or prediction at the gNB side.

In one example (Alt1), a higher layer parameter, e.g., subsetReporting, is configured and/or set to "enabled" in CSI-ResourceConfig/CSI-ReportConfig.

In one example (Alt2), a new reportQuantity is configured; e.g., in addition to or instead of L1-RSRP reporting, the UE can report differences/ratios between measured RSRPs; for this case, the new reportQuantity="difference or ratio reporting." In one example, the reported quantity is the ratio or difference between the best beam metric the UE determines, this can be for an RS that is not in the set or list or group of measurement RS resources, and the measured beam metric of a measurement RS resource.

In one example (Alt3), the number of configured beam reports is greater/smaller than a threshold, for example the threshold can be the number of beams reported in a beam report. For example, when this condition occurs the UE implicitly assumes that the measurement RS resources are different from the beam indication RS resources.

In step 2, the gNB configures the UE with reference signal resources that can be used for beam indication. These can be the same as or different from or a superset of or a subset of the reference signal resources for beam measurement and beam measurement reporting. If the same, this part of step 2 is included in step 1. The gNB may further configure TCI states for beaming indication using the configured reference signal resources for beam indication as source reference signals. The configuration can be by RRC signaling and/or by SIB (system information block) signaling. The UE receives this configuration from the gNB.

In step 3, the gNB activates and/or indicates reference signal resources that can be used for beam measurement and beam measurement reporting. The activation or indication can be by MAC CE signaling and/or by L1 control (e.g., DCI signaling) signaling. The UE receives this activation and/or indication from the gNB. In a variant, there is no activation or indication of the reference signal resources that can be used for beam measurement and beam measurement reporting, the RRC/SIB configured reference signal resources are used.

In one example, the MAC CE or L1 control (e.g., DCI) activated reference signal resources are indicated by a bitmap, with one bit for each RRC/SIB configured (or MAC CE activated) reference signal resource. A bit is set to one if the reference signal resource is activated, otherwise the bit is set to zero (or vice versa).

In one example, the list of RS resources can be partitioned into groups fixed in the specifications, for example, the list of RS resources can be partitioned into M groups. Wherein, M is specified in the system specifications and/or configured or updated by RRC signaling and/or MAC CE signaling and/or L1 control (e.g., DCI) signaling. In one example, M=2. The resource can be partitioned such that: (1) a first group includes resources with resource index I satisfying: (I % M)=0. Where, % is the modulo division operator, that returns the remainder when dividing two integers; (2) a second group includes resources with resource index I satisfying: (I % M)=1 . . . (3) a last group includes resources with resource index I satisfying: (I % M)=M−1.

In one example, when M=2, the first group is the RS resources with even index or ID, the second group is RS resources with odd index or ID.

In one example, the RS resources is each of the M groups is configured or updated by RRC signaling and/or MAC CE signaling and/or L1 control (e.g., DCI signaling).

In one example, the number of measurement RS resources in each group is the same. In another example, the number of measurement RS resources in each group can be different.

In one example, the UE can be indicated by MAC CE signaling and/or L1 control (e.g., DCI) signaling and/or RRC signaling which of the M groups of measurement RS resources to use for beam measurement and beam reporting. In one example, the UE is indicated one of the M groups to use. In another example, the UE can be indicated one or more of the M groups to be used, for example, this can be by a bitmap with M bits (one bit for each group) and the corresponding bit is set to "1" when the group is to be used and zero otherwise (or vice versa), in another example, a list of the groups to be used is signaled to the UE. In one example, the signaling to the UE can be through UE dedicated signaling, e.g., the channel conveying the group or groups of measurement RS resources to be used is transmitted to one UE. In another example, the signaling to the UE can be through group common signaling, e.g., the channel conveying the group or groups of measurement RS resources to be used is transmitted to a group of UEs.

In step 4, the UE measures the reference signal resources and sends a beam measurement report (BMR) to the gNB. The gNB receives the BMR. The gNB determines one or more TCI states to indicate to the UE. In one example, the gNB determines N TCI states to indicate to the UE.

In one example, the beam measurement report uses differential reporting, the first pair of measurement RS ID and quality metric includes the best (e.g., strongest) quality metric. Subsequent pairs of measurement RS ID and quality metric include a differential quality metric, e.g., ratio to or difference with the best quality metric. For example, if the quality metric is RSRP in dB, the quality metric for any pair other that the first pair is the difference between the RSRP of that pair and the strongest RSRP in dB. In another example, the beam measurement report uses absolute reporting for the metric (can also be in dB), each pair includes measurement RS ID and quality metric (not a relative or differential quality metric). In another example, the beam measurement report includes both differential and relative reporting as previously described as well as absolute reporting as previously described.

In one example, if the UE is indicated different RS resources for beam measurement and for beam indication, the UE can use a different L1-RSRP table for RSRP reporting in the beam measurement report. For example, the new L1-RSRP can contain more entries or finely quantized values. In one example, UE uses the parameters of a first table as specified in 3GPP standard specification TS 38.212 (as shown in TABLE 2) if not indicated different RS resources for beam measurement and for beam indication.

TABLE 2

| Field and bitwidth parameters | |
| --- | --- |
| Field | Bitwidth |
| CRI | $\lceil \log_2 (K_s^{CSI-RS}) \rceil$ |
| SSBRI | $\lceil \log_2 (K_s^{SSB}) \rceil$ |
| RSRP | 7 |
| Differential RSRP | 4 |
| CapabilityIndex | 2 |

In one example, the UE uses the parameters of a second table (e.g., TABLE 3) if indicated different RS resources for beam measurement and for beam indication. The parameters for TABLE 3 can have finer granularity than that of TABLE 2. The parameters (e.g., RSRP Bitwidth, Diff RSRS Bitwidth, Capability Index) of TABLE 3 can be specified in the system specifications and/or configured or updated by RRC signaling and/or MAC CE signaling and/or L1 control (e.g., DCI) signaling.

TABLE 3

Field and bitwidth parameters

| Field | Bitwidth |
|---|---|
| Measurement RS ID (e.g., CSI-RS and/or SSB) | $\left\lceil \log_2\left(\begin{array}{c}\text{Number of}\\ \text{measurement } RS\, ID\end{array}\right)\right\rceil$ |
| RSRP | RSRP Bitwidth |
| Differential RSRP | Diff RSRS Bitwidth |
| CapabilityIndex | Capability Index Bitwidth |

In one example, the UE uses the parameters of a second table (e.g., TABLE 4) if indicated different RS resources for beam measurement and for beam indication. The parameters for TABLE 4 can have finer granularity than that of TABLE 1. The parameters (e.g., RSRP Bitwidth, capability index) of TABLE 4 can be specified in the system specifications and/or configured or updated by RRC signaling and/or MAC CE signaling and/or L1 control (e.g., DCI) signaling.

TABLE 4

Field and bitwidth parameters

| Field | Bitwidth |
|---|---|
| Measurement RS ID (e.g., CSI-RS and/or SSB) | $\left\lceil \log_2\left(\begin{array}{c}\text{Number of}\\ \text{measurement } RS\, ID\end{array}\right)\right\rceil$ |
| RSRP | RSRP Bitwidth |
| Capability Index | Capability Index Bitwidth |

In one example, the UE uses the parameters of a second table (e.g., TABLE 5) if indicated different RS resources for beam measurement and for beam indication. The parameters for TABLE 5 can have finer granularity than that of TABLE 2. The parameters (e.g., Diff RSRS Bitwidth, capability index) of TABLE 4 can be specified in the system specifications and/or configured or updated by RRC signaling and/or MAC CE signaling and/or L1 control (e.g., DCI) signaling.

TABLE 5

Field and bitwidth parameters

| Field | Bitwidth |
|---|---|
| Measurement RS ID (e.g., CSI-RS and/or SSB) | $\left\lceil \log_2\left(\begin{array}{c}\text{Number of}\\ \text{measurement } RS\, ID\end{array}\right)\right\rceil$ |
| Differential RSRP | Diff RSRS Bitwidth |
| CapabilityIndex | Capability Index Bitwidth |

In one example, if the UE is indicated different RS resources for beam measurement and for beam indication, the UE can indicate or report, e.g., through a flag, if it has found better spatial domain filters (e.g., beams) outside the configured or activated or indicated measurement RS resources. This for example, can allow the gNB to update the measurement RS resources.

In one example, if the UE is indicated different RS resources for beam measurement and for beam indication, the UE can indicate or report a CRI (or SSBRI) outside the measurement RS resources and corresponding beam metric. In one example, this reporting is if the beam metric to be reported exceeds a threshold compared to the best beam metric for the measurement RS resources. In one example, the threshold for beam metric difference or ratio can be specified in the system specifications and/or configured or updated by RRC signaling and/or MAC CE signaling and/or L1 control (e.g., DCI) signaling.

In one example, if the UE is indicated different RS resources for beam measurement and for beam indication, the reported quantity is the ratio or difference between the best beam metric the UE determines, this can be for an RS that is not in the set or list or group of measurement RS resources, and the measured beam metric of a measurement RS resource.

In step 5, the gNB may configure or activate or trigger reference signal resources corresponding to source reference signals of the N TCI states of step 4. For example, the reference signal resources could be configured as periodic reference signal resources using RRC configuration. In one the example, the reference signal resources can be semi-persistent reference signal resources that are activated by MAC CE signaling or L1 control (e.g., DCI) signaling. In another example, the reference signal resources can be aperiodic reference signal resources that are triggered by L1 control (e.g., DCI) signaling or MAC CE signaling. The UE receives such configuration and/or activation and/or triggering. In one example, the UE measures a signal quality associated with these reference signals.

In step 6, the gNB sends an indication of the N TCI states activated in step 4. The UE receives such indication.

In one example, the N TCI states are indicated by MAC CE signaling.

In one example, the N TCI states are indicated by L1 control (e.g., DCI) signaling. In one example, the N TCI states can be indicated by a DL-related DCI, wherein the DL-related DCI includes a DL assignment (e.g., DCI Format 1_0 and/or DCI Format 1_1 and/or DCI Format 1_2). In one example, the N TCI states can be indicated by a DL-related DCI, wherein the DL-related DCI does not include (i.e., without) a DL assignment (e.g., DCI Format 1_0 and/or DCI Format 1_1 and/or DCI Format 1_2 without DL assignment). In one example, the N TCI states can be indicated by an UL-related DCI, wherein the UL-related DCI includes an UL grant (e.g., DCI Format 0_0 and/or DCI Format 0_1 and/or DCI Format 0_2). In one example, the N TCI states can be indicated by an UL-related DCI, wherein the UL-related DCI does not include (i.e., without) an UL grant (e.g., DCI Format 0_0 and/or DCI Format 0_1 and/or DCI Format 0_2 without UL grant). In one example, the N TCI states can be indicated by a purpose designed channel for beam indication (the DL-related DCI without DL assignment can be considered as one example of a purposed designed channel for beam indication). In one example, the N TCI states can be indicated by a channel for beam indication to a group of UEs.

In one example, the TCI states indicated to the UE, can correspond to code points activated by MAC CE signaling. The code points can be one or more of: (1) code point of joint TCI states; (2) code point DL TCI states; (3) code points of UL TCI states; or (4) code points of DL TCI states and UL TCI states.

In step 7, the UE determines which TCI state to apply to the spatial domain receive filter and/or the spatial domain transmit filter.

In one example, a source RS of each of the N TCI states is a DL reference signal (e.g., NZP CSI-RS and/or SSB). The reference signal resources corresponding to source RS of the N TCI states are configured or activated or triggered or signaled prior to the indication of the N TCI states (e.g., as described in step 5). The UE measures a metric for each of the source reference signals corresponding to the N TCI state. Wherein the metric can be one or more of: L1-RSRP, L1-SINR, virtual L1 BLER (e.g., BLER of a reference transmission), CQI, L3 RSRP (e.g., time-filter RSRP using an exponential averaging filtering or a sliding window filter or some other time domain filter). In one example, the source reference signal measured is of QCL Type D. In another example, the source reference signal measured is of any QCL type.

In one example, UE determines the TCI state with a source reference signal that has the best (e.g., highest) metric and applies the TCI state to the spatial domain reception filter and/or the spatial domain transmission filter.

In one example, it is up to UE's implementation to determine a TCI state to apply to the spatial domain reception filter and/or the spatial domain transmission filter.

In one example, the UE applies the first or the last or the n-th of the N-indicated TCI states to the spatial domain reception filter and/or the spatial domain transmission filter. Wherein, n can be configured or indicated to the UE.

In one example, a source RS of each of the N TCI states is an UL reference signal (e.g., NZP CSI-RS and/or SSB). The reference signal resources corresponding to source RS of the N TCI states are configured or activated or triggered or signaled prior to the indication of the N TCI states (e.g., as described in step 5).

In one example, UE determines the TCI state with a source reference signal that is a target RS of a second downlink source reference signal. The second downlink source reference signal has the best (e.g., highest) metric and applies the corresponding TCI state to the spatial domain reception filter and/or the spatial domain transmission filter.

In one example, it is up to UE's implementation to determine a TCI state to apply to the spatial domain reception filter and/or the spatial domain transmission filter.

In one example, the UE applies the first or the last or the n-th of the N-indicated TCI states to the spatial domain reception filter and/or the spatial domain transmission filter. Wherein, n can be configured or indicated to the UE.

In one further example, the UE transmits N source reference signals (e.g., SRS) corresponding to the N-indicated TCI states. In another example, the UE transmits N−1 source reference signals (e.g., SRS) corresponding to the N-indicated TCI states excepted for the determined TCI state as aforementioned.

In step 8, the UE may report the beam metrics associated with the source RS of the N TCI states configured in step 6. In one example, the source RS is a source RS with QCL Type D. In another example, the source RS is a source RS with any QCL Type (e.g., A, B, C or D). In one example, the source RS is a source RS used for spatial relation. In one example, the source RS can be a NZP-CSI-RS or an SSB. In a variant example, the source RS of the N TCI states is a SRS, the UE transmits SRS signals corresponding to source RS of the N TCI states configured in step 6. In a variant example, the source RS of the N TCI states is a SRS, the UE transmits SRS signals corresponding to source RS of the N TCI states configured in step 6 and applied to spatial domain transmission filter as described in step 7. In one example, the UE may report to the gNB in step 8, the TCI state the UE determined in step 7.

In step 9, the UE applies the TCI state determined in step 7 to the spatial domain filter.

In one example, for uplink transmissions from the UE, the UE applies the TCI state determined in step 7 to the UL spatial domain transmission filter. The gNB can try multiple reception hypothesis to determine the TCI state applied by the UE.

In one example, for uplink transmissions from the UE, the UE applies the TCI state determined in step 7 to the UL spatial domain transmission filter. The gNB applies one TCI state out of N TCI states to the UL spatial domain reception filter that the UE reported in step 8.

In one example, for uplink transmissions from the UE, the UE applies the TCI state determined in step 7 to the UL spatial domain transmission filter. The gNB can apply a wider spatial domain reception filter that can encompasses the N-indicated TCI states, this is at the expense of reduced beam forming gain. In one example, UE indicates to the gNB the one out of N TCI states used for UL transmission in the first transmission using such TCI state, gNB uses the wider spatial domain reception filter for the first transmission. Subsequent transmissions (after a beam indication latency), use a spatial domain reception filter corresponding to the indicated TCI state in the first transmission.

In one example, for downlink receptions at the UE, the UE applies the TCI state determined in step 7 to the DL spatial domain reception filter. The gNB applies one TCI state out of N TCI states to the DL spatial domain transmission filter that the UE reported in step 8.

In one example, for downlink receptions at the UE, the UE applies the TCI state determined in step 7 to the DL spatial domain reception filter, and the determined TCI state is the first or the last or the n-th of the N-indicated TCI states, wherein n can be configured or indicated to the UE. The gNB applies the first of or the last or the n-th of the N-indicated TCI states to the DL spatial domain transmission filter that the UE reported in step 8, wherein n can be configured or indicated to the UE.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
   a transceiver configured to:
   receive first configuration information for a set of reference signals (RSs),
   receive second configuration information for a set of resources for measurement reporting,
   receive a dynamic indication indicating (i) a subset of the set of RSs and (ii) a subset of the set of resources for measurement reporting, and transmit an acknowledgement in response to the dynamic indication; and
a processor operably coupled to the transceiver, the processor configured to perform a first measurement of the subset of RSs,
wherein the transceiver is further configured to transmit a first report based on the first measurement,
wherein transmission of the first report is based on resources in the subset for measurement reporting, and
wherein the first report is transmitted after a time T from an end of a channel conveying the acknowledgment.

2. The UE of claim 1, wherein the set of RSs is one of:
a synchronization signal/physical broadcast channel block (SSB),
a periodic non-zero power channel state information RS (NZP CSI-RS), and
a semi-persistent NZP CSI-RS.

3. The UE of claim 1, wherein:
the transceiver is further configured to receive an indication of transmission configuration indicator (TCI) states,
the processor is further configured to perform a second measurement of a source RS of the indicated TCI states, and
the transceiver is further configured to:
apply a first of the indicated TCI states to a spatial filter or quasi-colocation (QCL), and
transmit a second report based on the second measurement.

4. The UE of claim 1, wherein:
the first configuration information includes periodicity and an offset relative to system frame number 0, and
the periodicity and the offset corresponds to each RS in the set of RSs.

5. The UE of claim 1, wherein the transceiver is further configured to:
receive configuration information for a set uplink (UL) RSs,
receive dynamic indication of a subset of the set of UL RSs, and
transmit the subset of the set of UL RSs.

6. The UE of claim 5, wherein the set of UL RSs is one of:
a periodic sounding RS (SRS), and
a semi-persistent SRS.

7. A base station (BS), comprising:
a transceiver configured to:
transmit first configuration information for a set of reference signals (RSS),
transmit second configuration information for a set of resources for measurement reporting,
transmit a dynamic indication indicating (i) a subset of the set of RSs and (ii) a subset of the set of resources for measurement reporting,
receive an acknowledgement in response to the dynamic indication, and
receive a first report based on the subset of RSs; and
a processor operably coupled to the transceiver, the processor configured to determine first transmission configuration indication (TCI) states based on the first report,
wherein reception of the first report is based on resources in the subset for measurement reporting, and
wherein the first report is received after a time T from an end of a channel conveying the acknowledgment.

8. The BS of claim 7, wherein the set of RSs is one of:
a synchronization signal/physical broadcast channel block (SSB),
a periodic non-zero power channel state information RS (NZP CSI-RS), and
a semi-persistent NZP CSI-RS.

9. The BS of claim 7, wherein:
the transceiver is further configured to:
transmit an indication of the first TCI states,
apply a first of the indicated TCI states to a spatial filter or quasi-colocation (QCL), and
receive a second report based on a source RS of the indicated first TCI states, and
the processor is further configured to determine a second TCI states based on the second report.

10. The BS of claim 7, wherein:
the first configuration information includes periodicity and an offset relative to system frame number 0, and
the periodicity and the offset corresponds to each RS in the set of RSs.

11. The BS of claim 7, wherein the transceiver is further configured to:
transmit configuration information for a set uplink (UL) RSs,
transmit dynamic indication of a subset of the set of UL RSs, and
receive the subset of the set of UL RSs.

12. The BS of claim 11, wherein the set of UL RSs is one of:
a periodic sounding RS (SRS), and
a semi-persistent SRS.

13. A method of operating a user equipment (UE), the method comprising:
receiving first configuration information for a set of reference signals (RSS);
receiving second configuration information for a set of resources for measurement reporting;
receiving a dynamic indication indicating (i) a subset of the set of RSs and (ii) a subset of the set of resources for measurement reporting;
transmitting an acknowledgement in response to the dynamic indication;
performing a first measurement of the subset of RSs; and
transmitting a first report based on the first measurement,
wherein transmission of the first report is based on resources in the subset for measurement reporting, and
wherein the first report is transmitted after a time T from an end of a channel conveying the acknowledgment.

14. The method of claim 13, wherein the set of RSs is one of:
a synchronization signal/physical broadcast channel block (SSB),
a periodic non-zero power channel state information RS (NZP CSI-RS), and
a semi-persistent NZP CSI-RS.

15. The method of claim 13, further comprising:
receiving an indication of transmission configuration indicator (TCI) states,
performing a second measurement of a source RS of the indicated TCI states,
applying a first of the indicated TCI states to a spatial filter or quasi-colocation (QCL), and
transmitting a second report based on the second measurement.

16. The method of claim 13, wherein:
the first configuration information includes periodicity and an offset relative to system frame number 0, and the periodicity and the offset corresponds to each RS in the set of RSs.

17. The method of claim 13, further comprising:
receiving configuration information for a set uplink (UL) RSs, wherein the set of UL RSs is one of:
  a periodic sounding RS (SRS), and
  a semi-persistent SRS;
receiving dynamic indication of a subset of the set of UL RSs, and
transmitting the subset of the set of UL RSs.

* * * * *